US011087541B2

(12) United States Patent
McAdam et al.

(10) Patent No.: US 11,087,541 B2
(45) Date of Patent: Aug. 10, 2021

(54) LOCATION-BASED IDENTIFICATION OF PETROCHEMICAL ASSETS IN AN INDUSTRIAL PLANT

(71) Applicant: UOP LLC, Des Plaines, IL (US)

(72) Inventors: Rohan McAdam, Yetholme (AU); Graeme Laycock, Hunters Hill (AU); Peter Horsley, Sydney (AU); Stephen Coorey, Sydney (AU); Stephen Bruce, Sydney (AU)

(73) Assignee: Honeywell International Inc., Morris Planes, NJ (US)

( * ) Notice: Subject to any disclaimer, the term of this patent is extended or adjusted under 35 U.S.C. 154(b) by 0 days.

(21) Appl. No.: 16/207,449

(22) Filed: Dec. 3, 2018

(65) Prior Publication Data
US 2020/0175765 A1 Jun. 4, 2020

(51) Int. Cl.
*G06T 19/00* (2011.01)
*G06T 7/73* (2017.01)
*G06F 16/29* (2019.01)
*G06K 9/00* (2006.01)

(52) U.S. Cl.
CPC ............ *G06T 19/006* (2013.01); *G06F 16/29* (2019.01); *G06K 9/00671* (2013.01); *G06T 7/73* (2017.01); *G06T 2207/30204* (2013.01)

(58) Field of Classification Search
CPC ................................ G06T 19/006; G06T 7/73
See application file for complete search history.

(56) References Cited

U.S. PATENT DOCUMENTS

| | | | | |
|---|---|---|---|---|
| 2012/0176410 A1* | 7/2012 | Meier | ..................... | G06F 3/011 345/633 |
| 2013/0049976 A1* | 2/2013 | Maggiore | ............. | G06T 19/006 340/686.1 |
| 2014/0022281 A1* | 1/2014 | Georgeson | ................ | B64F 5/60 345/633 |
| 2014/0210947 A1* | 7/2014 | Finn | ..................... | G01C 15/002 348/46 |
| 2014/0240469 A1* | 8/2014 | Lee | ........................ | G01C 11/00 348/48 |

* cited by examiner

*Primary Examiner* — Yi Yang
(74) *Attorney, Agent, or Firm* — Jetter & Associates. P.A.; Neil R. Jetter

(57) ABSTRACT

Systems, apparatuses, and methods are described for determining the location of a worker in a plant, such as a petrochemical manufacturing or refining facility in order to render an augmented view of at least one asset in the vicinity of a fiducial marker. A field worker mobile device may scan the fiducial marker and render operating values for a measurable element of the assets in the field of view of the mobile device. Location of the mobile device with respect to the assets in the vicinity of the fiducial marker may be determined based upon the known location and orientation of the fiducial marker and/or the known location and orientations of the assets relative to the fiducial marker.

19 Claims, 16 Drawing Sheets

LOCATION-BASED IDENTIFICATION OF PETROCHEMICAL ASSETS IN AN INDUSTRIAL PLANT

FIELD

The disclosure relates generally to a method and system for managing the operation of a plant, such as a chemical plant or a petrochemical plant or a refinery, and more particularly to a method for improving the performance of components that make up operations in a plant.

BACKGROUND

Industrial process control and automation systems are often used to automate large and complex industrial processes. Industrial processes are typically implemented using large numbers of devices, such as pumps, valves, compressors, or other industrial equipment used to implement various aspects of the industrial processes. With these large numbers of devices, scheduled or responsive maintenance needs to be efficient in order to maintain overall efficiency of a plant.

SUMMARY

The following summary presents a simplified summary of certain features. The summary is not an extensive overview and is not intended to identify key or critical elements.

Numerous devices in these types of systems may generate operational, diagnostic, or other data and transmit the data to other components for analysis, storage, or other uses. For example, at least some of this data may be used to identify issues in control and automation systems or in the underlying industrial processes. Maintenance personnel or other personnel may then be dispatched to repair or replace equipment or take other suitable corrective actions to resolve the issues. Similar operations may occur in other systems that include large numbers of devices, such as building management systems.

Working effectively in an industrial enterprise fundamentally requires that field workers know what tasks to perform, how to perform them, and on which specific pieces of equipment. Furthermore, workers require additional information about the current production process or business situation that may affect the tasks to be performed, the specific procedures to be followed, and the specific pieces of equipment that need to be worked on.

Commonly available mobile devices such as a smartphone, smart glasses or tablet devices that include camera, screen and processor, are increasingly being used to assist field workers in an industrial plant environment by displaying identifying information, specifications, procedures, and live process data related to equipment assets in the industrial plant. One technique for doing this is to present asset-related information in an augmented view of an asset in which a camera-based view of the equipment includes visual overlays of relevant data. This technique, commonly known as Augmented Reality (AR), presents equipment-related information as part of a user's natural view of an asset, providing a simple and direct way to access and use this information. This approach relies on the AR application running on a user's device being able to positively identify an asset together with the relative location and orientation of the user's device in order to overlay the correct information in the correct position.

One way to accomplish such is by placing a fiducial marker on each asset, which would be detected by the augmented reality application to identify that asset and estimate the relative position and orientation of the user's device. However, industrial plants typically have hundreds or thousands of equipment assets, making labelling with markers time consuming and expensive. Additionally, the shape, location, and surface material of the equipment may not be suited for application of a marker. An approach based on recognition of markers on individual assets also makes it hard to provide an augmented view across a collection of assets when tags on some assets may not be visible or too far away to be properly recognized. The disclosure provides for placing a single marker near a group of assets in order to correctly provide an augmented view of those assets. The number of markers required is reduced by an order of magnitude or more, depending on the layout density of the assets.

Other technical features may be readily apparent to one skilled in the art from the following figures, descriptions, and claims.

BRIEF DESCRIPTION OF DRAWINGS

The present disclosure is illustrated by way of example and not limited in the accompanying figures in which like reference numerals indicate similar elements and in which.

DETAILED DESCRIPTION

Figure 1:
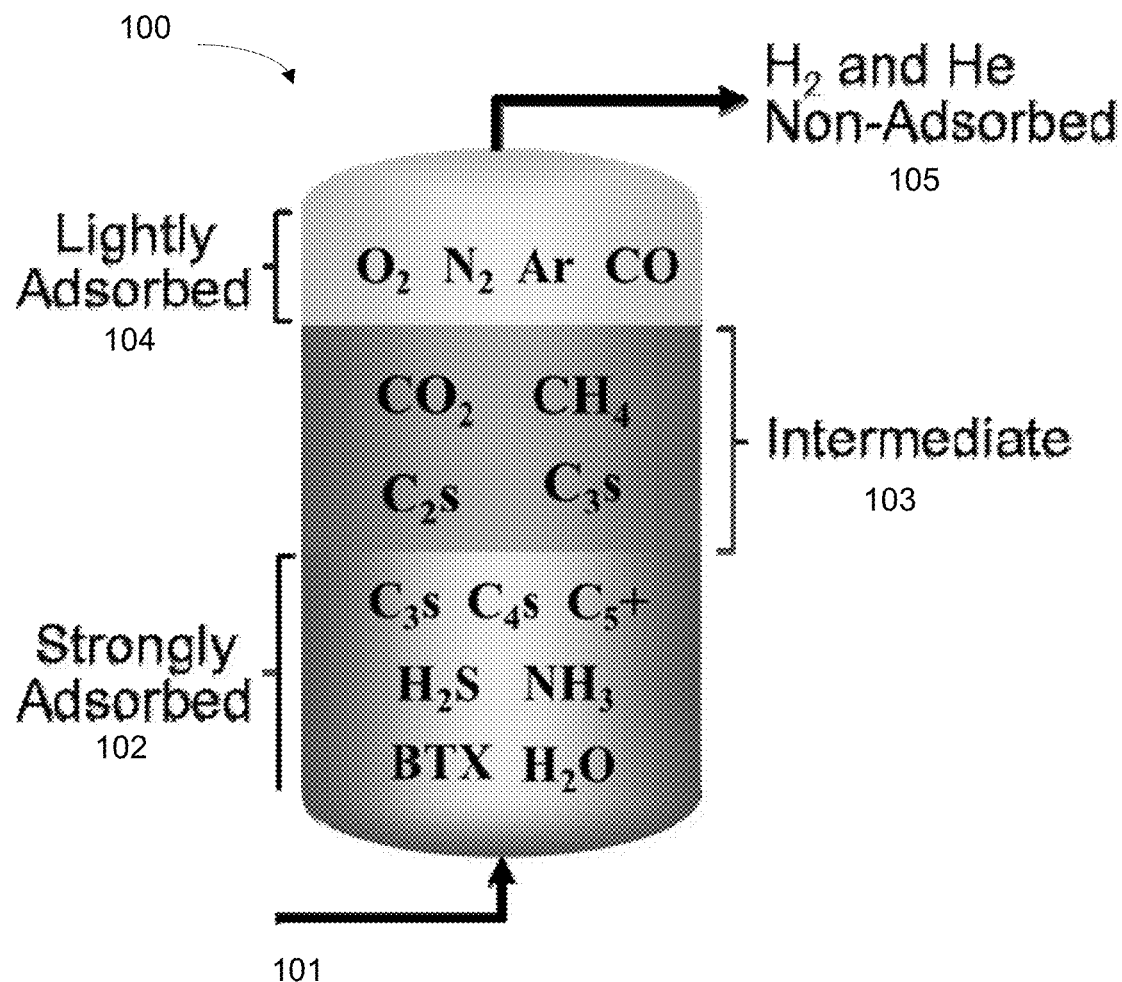
FIG. 1 depicts a schematic of an adsorption vessel for a pressure swing adsorption unit in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Further, various connections between elements are discussed in the following description. It is noted that these connections are general and, unless specified otherwise, may be direct or indirect, wired or wireless, and that the specification is not intended to be limiting in this respect.

A chemical plant or a petrochemical plant or a refinery may include one or more pieces of equipment that process one or more input chemicals to create one or more products. References herein to a "plant" are to be understood to refer to any of various types of chemical and petrochemical manufacturing or refining facilities. References herein to a plant "operators" are to be understood to refer to and/or include, without limitation, plant planners, managers, engineers, technicians, technical advisors, specialists (e.g., in instrumentation, pipe fitting, and welding), shift personnel, and others interested in, starting up, overseeing, monitoring operations of, and shutting down, the plant.

A piece of equipment commonly used in many petrochemical and refinery processes is a pressure swing adsorption (PSA) unit. Adsorption is the preferential partitioning of substances from the gaseous or liquid phase onto the surface of a solid substrate (adsorbent). Most PSA units are used to recover and purify hydrogen process streams such as from hydrocracking and hydrotreating process streams. But PSA units may also be used to recover and purify helium, methane, monomer, chlorine, and carbon dioxide. Most hydrogen PSA unit applications are used for steam methane reformers, refinery off-gas (Platforming, HC, etc.), and ethylene off-gas. PSA units may accept feeds with purities from about 35% up to 99% and may be designed for a very wide range of product rates.

A typical PSA unit may have a control system containing hardware, software, and human-machine interface for operator interface, and a valve skid containing control valves, piping, and instrumentation. The devices in the valve skid communicate with the control system to operate the PSA. The PSA unit also contains multiple adsorber vessels and a tail gas surge tank. The adsorber vessels contain adsorbents.

There may be any number of adsorber vessels depending on the plant design, for example at least 3 and up to 20 adsorber vessels, often referred to as beds—e.g., a 6 bed polybed PSA unit or a 10 bed polybed PSA unit. Parameters that are monitored include feed source, feed pressure, feed capacity, recovery, and purity. Loading refers to the quantity of adsorbed material per mass unit of adsorbent. In this one example, any of a number of measurable elements of a PSA may be measured for a current operating condition data, such as current temperature, current pressure, etc. The current operating condition may be monitored and maintained over time, whether periodically or upon request. Whether requested or periodically, the current operating condition may be stored as current asset condition data, e.g., the current temperature for a particular asset, e.g., PSA unit, may be stored.

FIG. 1 represents flow through an adsorber vessel 100 during adsorption. The feed gas 101 is introduced into the bottom of the adsorber vessel and contacts the adsorbent. Impurities are removed down to any level required. Heavy components as those that are strongly adsorbed ($C_4+$, $H_2S$, $NH_3$, BTX and H2O) are removed in the bottom portion of the bed (with a weak adsorbent) 102. Intermediate components, such as CO, $CH_4$, $CO_2$, $C_2$ts, and $C_3$s, are removed in the middle of the bed 103. Light components are more difficult to adsorb (e.g., require a very strong adsorbent) 104. Examples are: $O_2$, Ar, and $N_2$. These components are removed at the top of the bed, and the separation is keyed on the lightest (or most difficult to adsorb) component. $H_2$ and He are essentially non-adsorbed 105.

Figure 2:
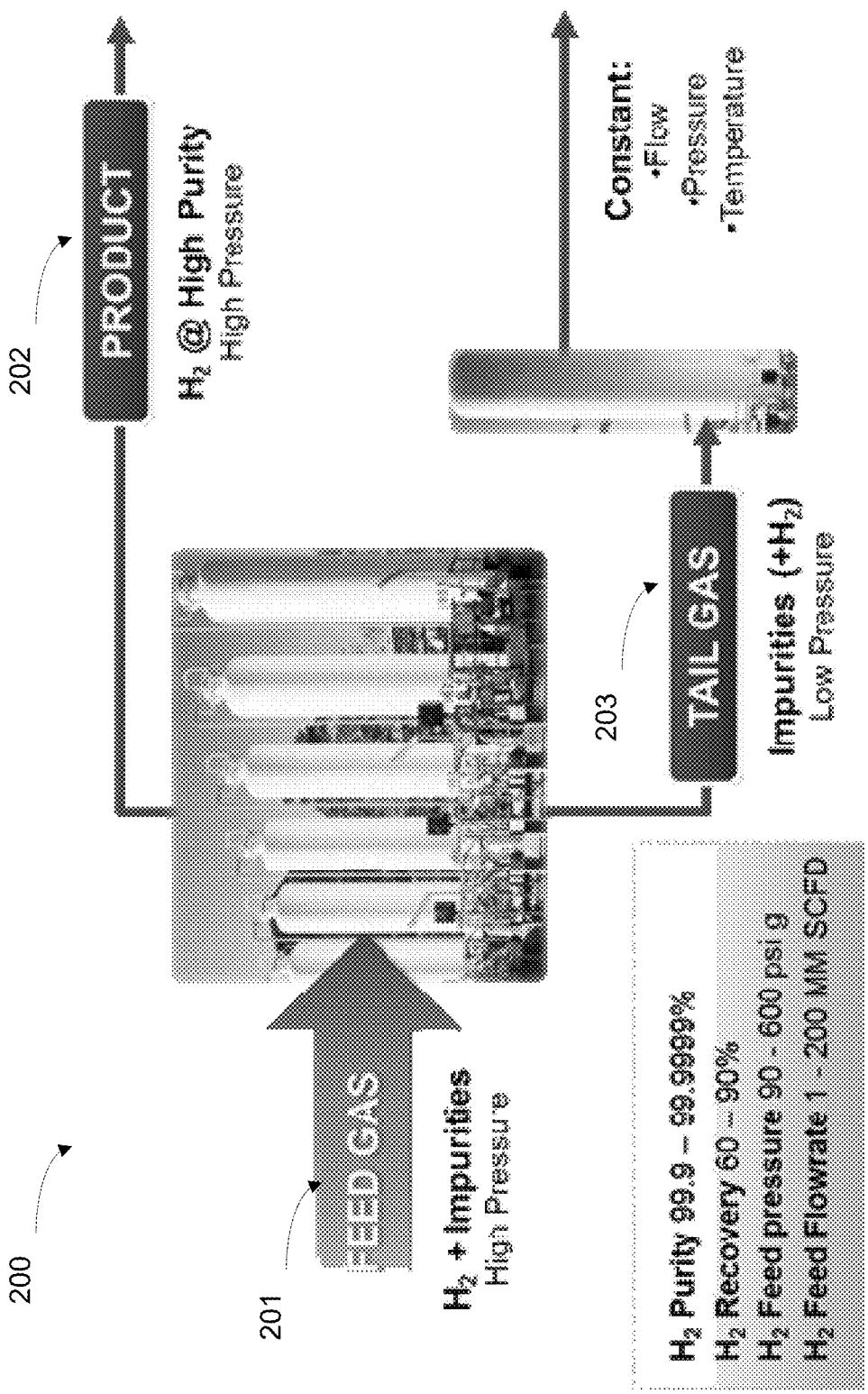
FIG. 2 depicts an illustrative pressure swing adsorption unit for a hydrogen purification process in accordance with one or more example embodiments.

The PSA unit relies on a pressure swing cycle and the ability of adsorbents to adsorb more impurities at high pressure than at low pressure. FIG. 2 depicts a PSA basic flow diagram 200. Feed 201 enters at high pressure, constant flow rate, constant pressure, and constant temperature. Product (e.g., high purity $H_2$) 202 leaves at high pressure, constant flow rate, constant pressure, and constant temperature. In time, the adsorbent becomes saturated with impurities 203 and the impurities must be removed.

Hydrogen recovery (%) is the quantity of hydrogen in the product stream divided by the quantity of hydrogen in the feed stream. Generally, the higher the number of adsorber units, the greater the % hydrogen recovery. Recovery is maximized through pressure equalizations.

Figure 3B:
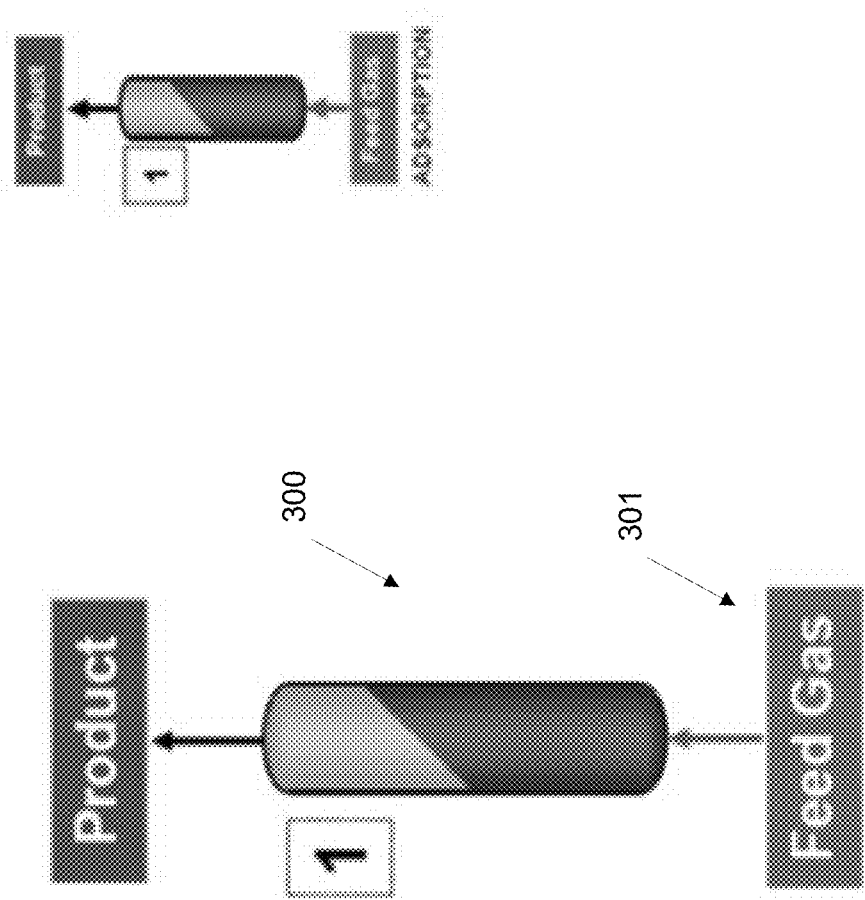
FIG. 3A-3E each depict steps of operation of a pressure swing adsorption unit for a hydrogen purification process in accordance with one or more example embodiments.
Figure 3A:
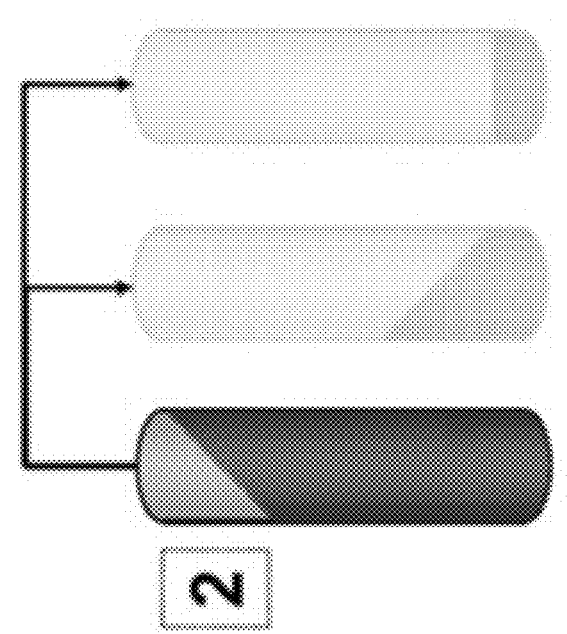
Figure 3D:
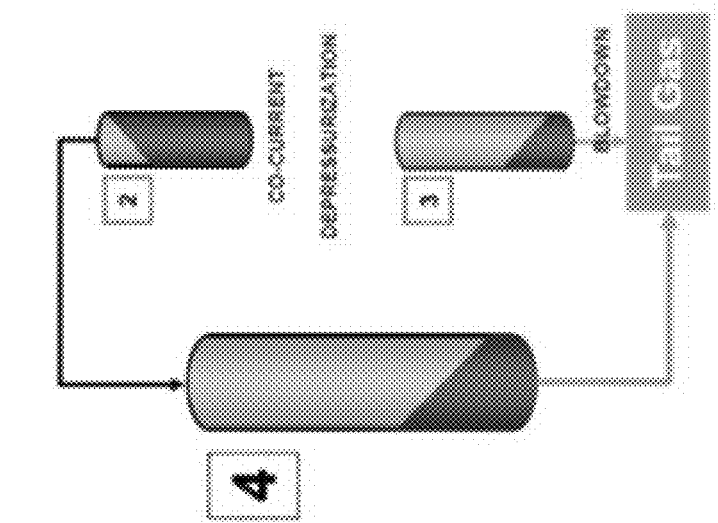
Figure 3C:
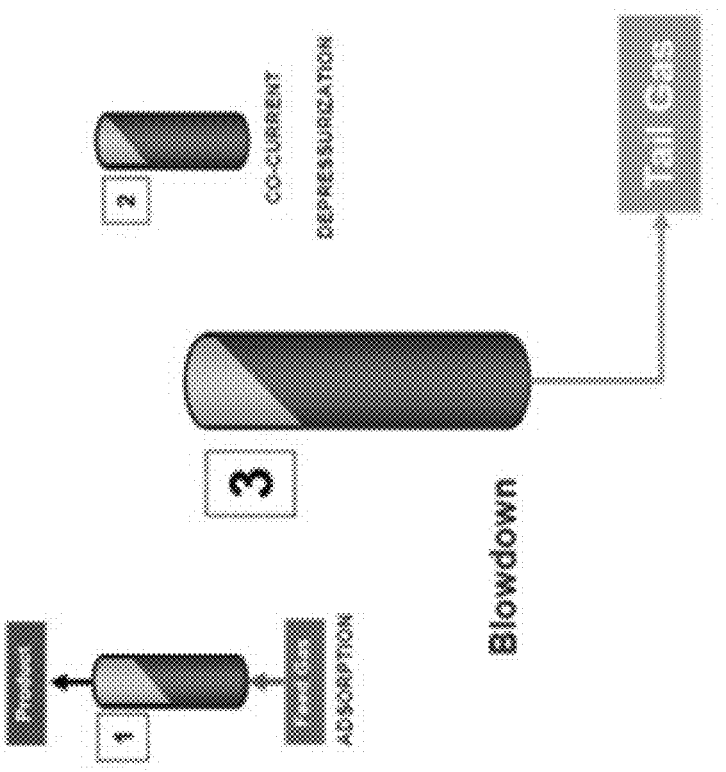
Figure 3F:
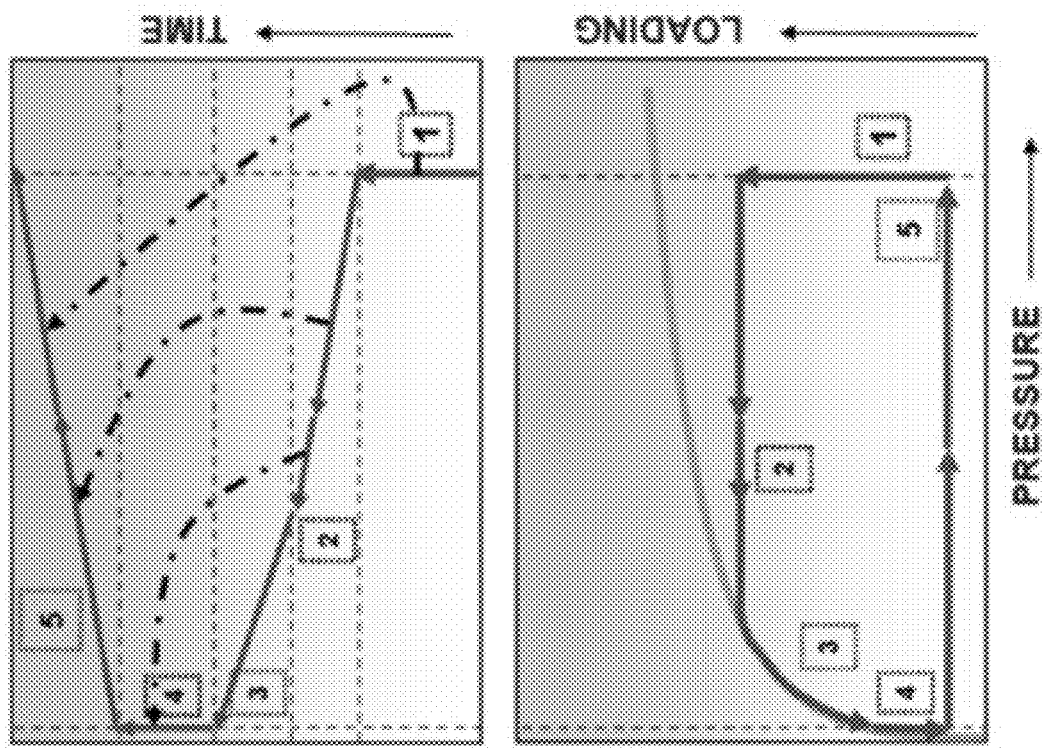
FIG. 3F depicts the pressure of each step over time.
Figure 3E:
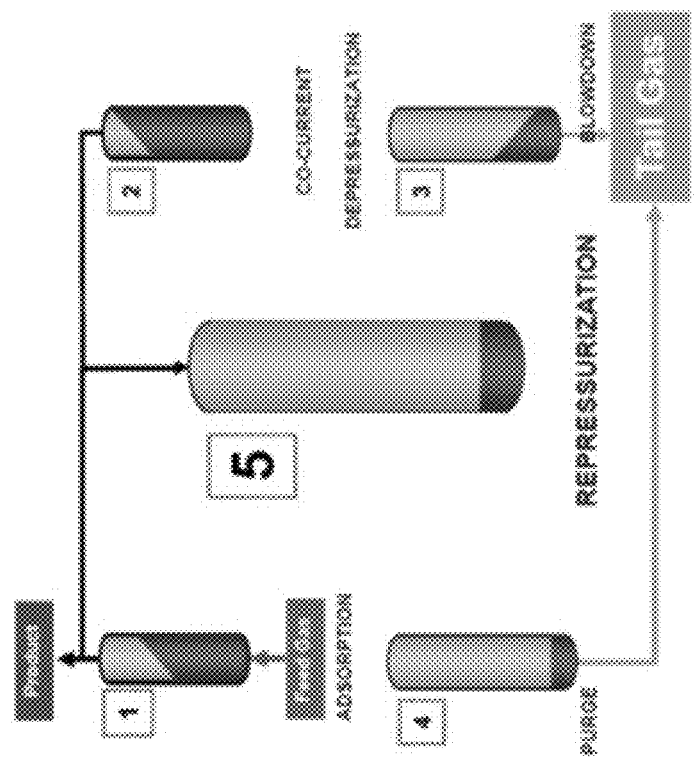

FIGS. 3A-3E depict steps in a typical PSA process and FIG. 3F depicts pressure and loading over time for each step. Steps 1 to 5 (adsorption, co-current depressurization, counter-current depressurization, purge, re-pressurization) are indicated in boxes having the corresponding numbers in FIGS. 3A-3F. As shown in FIG. 3A, step 1, feed gas 301 flows through an adsorber 300 whereby impurities are adsorbed onto the adsorbent and product 303 exits at the top. See FIG. 2, described above. Pressure increases as loading increases in the adsorber vessel as seen in FIG. 3F. Once the adsorbent is saturated with impurities, the adsorption step is discontinued. As shown in FIG. 3B, step 2, and FIG. 3F pressure is equalized by passing the hydrogen stream over to one or more adsorber vessels via co-current depressurization and purging of the adsorber vessel. As shown in FIG. 3C and FIG. 3F, step 3, pressure is decreased in the adsorber vessel via counter-current depressurization or blowdown. This step removes the impurities from the adsorber unit. As shown in FIG. 3D and FIG. 3F, step 4, the adsorber vessel is purged using co-current depressurization with another adsorber vessel. The product from the blow down of step 3 and the purge of step 4 is tail gas, which may be sent to a burner. As shown in FIG. 3E and FIG. 3F, step 5, the adsorber vessel is repressurized.

The off-gas or tail gas stream from a PSA operates at varying flow and composition; hence a surge tank is utilized to dampen flow fluctuations caused by the cyclic nature of the process and provide mixing. The resulting tail gas stream is a constant flow, pressure, temperature off-gas, usually at low pressure. Although the PSA is a cyclic process, the product and tail gas streams are uninterrupted and at constant pressure and flowrate. The feed gas and hydrogen product stream operate at nearly the same pressure. The impurities and some unrecovered hydrogen are rejected at low pressure. The pressure of the tail gas generally has a strong impact on the efficiency of the PSA unit, and hence may be monitored and current operating conditions of the PSA unit may be stored in a memory.

An impurity level signal is used to adjust the operation of the PSA unit for optimum recovery, product purity, and maximum capacity. The system maintains product purity by taking automatic corrective action to the unit's operation before significant levels of impurities may break through into the product gas (feed forward control). For each cycle, a self-tuning function monitors and adjusts the initial opening values of certain valves (e.g., PP, BD, Rep) to maintain the most efficient operation. The self-tuning function may adjust for positioner drift, changes in the flow characteristic from the vessels, etc.

The PSA unit may be designed to automatically pressurize each vessel for start-up. Auto pressure start-up helps ensure the smoothest possible start-up with the least operator intervention by automatically ramping each adsorber to the appropriate start-up pressure. Included in automatic capacity control is automatic tail gas flow adjustment to minimize fluctuations in tail gas flow and pressure.

A PSA unit may produce very high purity hydrogen, typical total impurity levels in the product are between 1000 and 10 ppm, or even lower impurity levels. But the process must be carefully monitored in order to achieve and maintain such purity levels.

The process of adsorption and desorption occurs quite rapidly, e.g., every 90 seconds. Hence, the pressure in each adsorber vessel increases and decreases rapidly and the valves used in the process must cycle on and off continuously and quickly. As many adsorber vessels may be used in a PSA unit, many valves are utilized in the process. Ideally, such valves operate in an efficient manner. The valves control the drastic changes in pressure that occurs in each adsorber vessel. Each adsorber vessel utilizes 3 to 5 valves, for example. Each valve cycles 100,000 to 200,000 cycles per year. Thus, the process is very abusive on the valves. The specialized valves contain soft seals that break down over time and need to be replaced or rebuilt. Sometimes the valves will stick open or closed, resulting in a significant rock to the system.

Often the system will be operated until one or more valves fail, at which point the system may need to be taken offline at an inopportune time in the process. This is not efficient and may be expensive and wasteful. Further, the catalysts or adsorbents should be replaced prior to saturation; otherwise, if catalysts or adsorbents become deactivated or saturated, contaminants will not be removed and the desired purity of the hydrogen stream will not be achieved.

The present disclosure is directed to repairs and maintenance for equipment designed for processing or refining materials like catalyst or adsorbents (e.g., equipment such as valves, rotating equipment, pumps, heat exchangers, compressors, gates, drains, and the like). The system may be configured to take one or more actions, such as sending one or more alerts or sounding one or more alarms if certain conditions are met, as well as instructions for maintenance or repair of a piece of equipment. Additionally, this disclosure is directed to compiling and analyzing operational performance data and efficiently presenting this data (e.g., to a user) to improve system operations and efficiency with a step-by-step workflow on a mobile device that may be modified (e.g., partway through the workflow) depending on certain asset operation conditions occurring at the time of maintenance or repair.

Suitable sensors include pressure sensors, temperature sensors, flow sensors for feed and product streams, chemical composition analyzers, and liquid level sensors. In some examples, any of a number of such sensors may be positioned throughout a PSA unit. In addition, control valves and valve-position sensors may be positioned in a PSA unit. Other sensors may be used, such as moisture sensors/analyzers, infrared cameras, and/or tunable laser diodes.

In some embodiments, the system may include analyzers on the Feed, Product, and/or Tail Gas lines in order to feed composition data into an analytics engine (e.g., a data analysis platform). Some embodiments may include one or more gas chromatographs to monitor the composition of each of the feed, product, and/or tail gas streams. The online gas chromatographs may enable accurate and timely composition data into the analytics engine, which may increase the accuracy of the analytics calculation. One or more additional metrics and/or features may also be included.

In some plants, an operational objective may be to improve PSA unit operation on an ongoing and consistent basis. Therefore, a system may deliver timely and/or regular reports indicating current operating conditions, along with interpretation and consulting on what actions may be performed to improve PSA unit performance.

Some plants routinely require technical support in the operation of the plant. Many of these plant operators perform little to no past/present/future analysis on the operation of their plant. This disclosure may solve both of those problems by analyzing plant data and incorporating algorithms and rules to proactively manage the plant and provide notice and step-by-step instructions for replacing or repairing assets like catalysts or adsorbents.

The disclosure ties together plant information with big data and analytics. The disclosure may also empower review of real plant data, which may allow for more accurate fault models based on, e.g., catalyst adsorbent materials. Ultimately, the disclosure may result in a more robust product tailored for a specific plant with the ability to provide and modify mobile workflows for workers in the plant based upon conditions (e.g., real-time or nearly real-time conditions) of the assets under review for repair or maintenance. The advantages that may be achieved are numerous and rooted in both new product development and optimization of plants.

The present disclosure incorporates technical service know-how and utilizes automated rules. The present disclosure provides assurance that a unit is operating at optimum purity/recovery while protecting adsorbent load, including capacity/purity monitoring; unit on-stream percentage; switchover history/time in each mode; process alarm tracking and diagnostics; and/or dashboard links to electronic operating manual. The present disclosure also provides maximizing on-stream time by recording, identifying, and/or scheduling maintenance activities, including valve cycle count and time since last maintenance; identifying suspected leaking valves; advanced valve diagnostics (e.g., open/close speed, overshoot, etc.); vessel cycle count; spare parts information/ordering support; and/or control panel software updates. The present disclosure also provides quick resolution of unplanned downtime, including a technical service group having access to internal dashboard for each plant, including access to preconfigured trends, displays, and/or historical data.

Figure 4A:
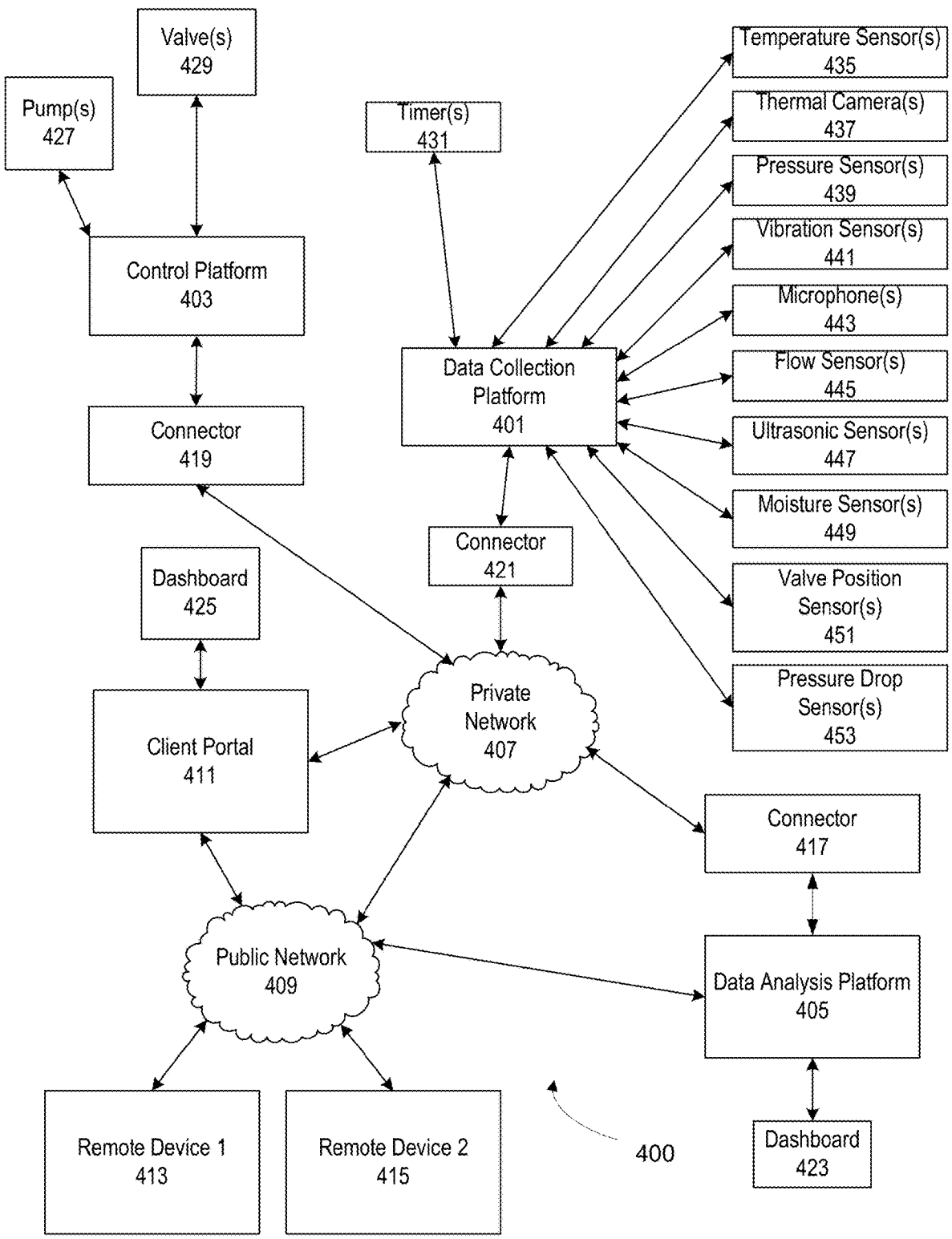
FIG. 4A depicts an illustrative computing environment for managing the operation of one or more pieces of equipment in a plant in accordance with one or more example embodiments.

The system may include one or more computing devices or platforms for collecting, storing, processing, and analyzing data from one or more sensors. FIG. 4A depicts an illustrative computing system 400 that may be implemented at one or more components, pieces of equipment (e.g., PSA units), and/or plants. FIG. 4A-FIG. 4E (hereinafter collectively "FIG. 4"), show, by way of illustration, various components of the illustrative computing system in which aspects of the disclosure may be practiced. It is to be understood that other components may be used, and structural and functional modifications may be made, in one or more other embodiments without departing from the scope of the present disclosure. Moreover, various connections between elements are discussed in the following description, and these connections are general and, unless specified otherwise, may be direct or indirect, wired or wireless, and/or combination thereof, and that the specification is not intended to be limiting in this respect.

Figure 5:
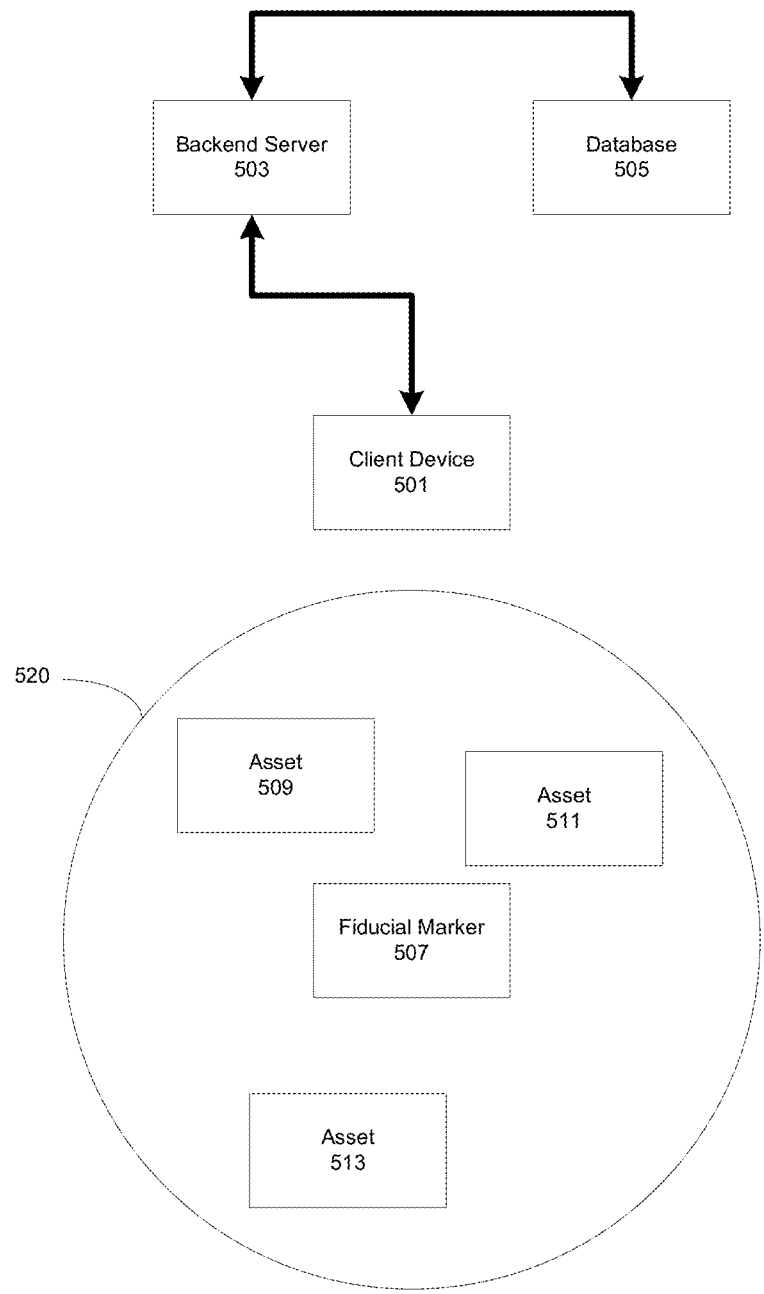
FIG. 5 depicts an illustrative computing environment for managing the operation of one or more pieces of equipment in a plant in accordance with one or more example embodiments.

FIG. 4A depicts an illustrative operating environment 400 in which various aspects of the present disclosure may be implemented in accordance with example embodiments. The computing system environment illustrated in FIG. 4A is only one example of a suitable computing environment and is not intended to suggest any limitation as to the scope of use or functionality contained in the disclosure. FIG. 5 is another illustrative operating environment in which various aspects of the present disclosure may be implemented in accordance with example embodiments. The computing system environment of FIG. 4A may include various sensor, measurement, and data capture systems, a data collection platform 401, a data analysis platform 405, a control platform 403, a client portal 411, one or more networks 407 and 409, one or more remote devices 413 and 415, one or more connectors 417, 419, and 421 and/or one or more other elements. The numerous elements of the computing system environment 400 of FIG. 4A may be communicatively coupled through one or more networks. For example, the numerous platforms, devices, sensors, and/or components of the computing system environment may be communicatively coupled through a private network 407. The sensors may be positioned on various components in the plant and may communicate wirelessly or wired with one or more platforms illustrated in FIG. 4A. The private network 407 may comprise, in some examples, a network firewall device to prevent unauthorized access to the data and devices on the private network. Alternatively, the private network 407 may be isolated from external access through physical means, such as a hard-wired network with no external, direct-access point. The data communicated on the private network 407 may be optionally encrypted for further security. Depending on the frequency of collection and transmission of sensor measurements and other data to the data collection platform 401, the private network 407 may experience large bandwidth usage and may be technologically designed and arranged to accommodate for such technological issues. Moreover, the computing system environment 400 may also include a public network that may be accessible to remote devices 413 and 415. In some examples, the remote device 413 and 415 may be located not in the proximity (e.g., more than one mile away) of the various sensor, measurement, and data capture systems illustrated in FIG. 4A. In other examples, the remote device 413 and 415 may be physically located inside a plant, but restricted from access to the private network 407; in other words, the adjective "remote," need not necessarily require the device to be located at a great distance from the sensor systems and other components.

Although the computing system environment of FIG. 4A illustrates logical block diagrams of numerous platforms and devices, the disclosure is not so limited. In particular, one or more of the logical boxes in FIG. 4 may be combined into a single logical box or the functionality performed by a single logical box may be divided across multiple existing or new logical boxes. For example, aspects of the functionality performed by the data collection platform 401 may be incorporated into one or each of the sensor devices illustrated in FIG. 4A. As such, the data collection may occur local to the sensor device, and the enhanced sensor system may communicate directly with one or more of the control platform 403 and/or data analysis platform 405. Such an embodiment is contemplated by FIG. 4A. Moreover, in such an embodiment, the enhanced sensor system may measure values common to a sensor, but may also filter the measurements such just those values that are statistically relevant or of-interest to the computing system environment are transmitted by the enhanced sensor system. As a result, the enhanced sensor system may include one or more processor (or other circuitry that enables execution of computer instructions) and one or more memories to store those instructions and/or filtered data values. The processor(s) may be embodied as an application-specific integrated circuit (ASIC), FPGA, or other hardware- or software-based module for execution of instructions. In another example, one or more sensors illustrated in FIG. 4A may be combined into an enhanced, multi-purpose sensor system. Such a combined sensor system may provide economies of scale with respect to hardware components such as processors, memories, communication interfaces, and others.

In yet another example, the data collection platform 401 and data analysis platform 405 may reside on a single server computer or virtual machine and be depicted as a single, combined logical box on a system diagram. Moreover, one or more data stores may be illustrated in FIG. 4A separate and apart from the data collection platform 401 and data analysis platform 405 to store a large amount of values collected from sensors and other components. The data stores may be embodied in a database format and may be made accessible to the public network 409; meanwhile, the control platform 403, data collection platform 401, and data analysis platform 405 may be restricted to the private network 407 and left inaccessible to the public network 409. As such, the data collected from a plant may be shared with users (e.g., engineers, data scientists, others), a company's employees, and even third parties (e.g., subscribers to the company's data feed) without compromising potential security requirements related to operation of a plant. The databases may be accessible to one or more users and/or remote devices 413 and 415 over the public network 409.

Referring to FIG. 4A, process measurements from various sensor and monitoring devices may be used to monitor conditions in, around, and on process equipment (e.g., PSA units). Such sensors may include, but are not limited to, pressure sensors 439, differential pressure sensors, other flow sensors 445, temperature sensors 435 including thermal cameras 437 and skin thermocouples, pressure drop sensors 453, capacitance sensors, weight sensors, gas chromatographs, moisture sensors 449, ultrasonic sensors 447, position sensors 451, timing sensors 431, vibration sensors 441, level sensors, liquid level (hydraulic fluid) sensors, and other sensors commonly found in the refining and petrochemical industry. Further, process laboratory measurements may be taken using gas chromatographs, liquid chromatographs, distillation measurements, octane measurements, and other laboratory measurements. System operational measurements also may be taken to correlate the system operation to the PSA unit measurements.

In addition, sensors may include transmitters and deviation alarms. These sensors may be programmed to set off an alarm, which may be audible and/or visual. Other sensors may transmit signals to a processor or a hub that collects the data and sends to a processor. For example, temperature and pressure measurements may be sent to a hub (e.g., data collection platform). In one example, temperature sensors may include thermocouples, fiber optic temperature measurement, thermal cameras, and/or infrared cameras. Skin thermocouples may be applied to tubes or placed directly on a wall of an adsorption unit. Alternatively, thermal (infrared) cameras may be used to detect temperature (e.g., hot spots) in one or more aspects of the equipment, including tubes. A shielded (insulated) tube skin thermocouple assembly may be used to obtain accurate measurements. One example of a thermocouple may be a removable XTRACTO Pad. A thermocouple may be replaced without any additional welding. Clips and/or pads may be utilized for ease of replacement. Fiber Optic cable may be attached to a unit, line, or vessel to provide a complete profile of temperatures.

Furthermore, flow sensors 445 may be used in flow paths such as the inlet to the path, outlet from the path, or within the path. If multiple tubes are utilized, the flow sensors may be placed in corresponding positions in each of the tubes. In this manner, one may determine if one of the tubes is behaving abnormally compared to other tubes. Flow may be determined by pressure-drop across a known resistance, such as by using pressure taps. Other types of flow sensors include, but are not limited to, ultrasonic, turban meter, hot wire anemometer, vane meter, Kármán™, vortex sensor, membrane sensor (membrane has a thin film temperature sensor printed on the upstream side, and one on the downstream side), tracer, radiographic imaging (e.g., identify two-phase vs. single-phase region of channels), an orifice plate in front of or integral to each tube or channel, pitot tube, thermal conductivity flow meter, anemometer, internal pressure flow profile, and/or measure cross tracer (measuring when the flow crosses one plate and when the flow crosses another plate).

Moisture level sensors 449 may be used to monitor moisture levels at one or more locations. For example, moisture levels at an outlet may be measured as a measurable element. Additionally, moisture levels at an inlet of the PSA unit or adsorption vessel may be measured. In some embodiments, a moisture level at an inlet may be known (e.g., a feed is used that has a known moisture level or moisture content). A gas chromatograph on the feed to the PSA unit may be used to speciate the various components to provide empirical data to be used in calculations.

Sensor data, process measurements, and/or calculations made using the sensor data or process measurements may be used to monitor and/or improve the performance of the equipment and parts making up the equipment, as discussed in further detail below. For example, sensor data may be used to detect that a desirable or an undesirable chemical reaction is taking place within a particular piece of equipment, and one or more actions may be taken to encourage or inhibit the chemical reaction. Chemical sensors may be used to detect the presence of one or more chemicals or components in the streams, such as corrosive species, oxygen, hydrogen, and/or water (moisture). Chemical sensors may utilize gas chromatographs, liquid chromatographs, distillation measurements, and/or octane measurements. In another example, equipment information, such as wear, efficiency, production, state, or other condition information, may be gathered and determined based on sensor data.

Corrective action may be taken based on determining this equipment information. For example, if the equipment is showing signs of wear or failure, corrective actions may be taken, such as taking an inventory of parts to ensure replacement parts are available, ordering replacement parts, and/or calling in repair personnel to the site. Certain parts of equipment may be replaced immediately. Other parts may be safe to continue to use, but a monitoring schedule may be adjusted. Alternatively or additionally, one or more inputs or controls relating to a process may be adjusted as part of the corrective action. These and other details about the equipment, sensors, processing of sensor data, and actions taken based on sensor data are described in further detail below. Such corrective actions may be implemented as part of a modified mobile workflow. Such a mobile workflow may include step-by-step instructions/procedures for a field worker to implement and the workflow may be modified in response to a current operating condition for a measurable element, such as a pressure measurement, of an asset, such as a PSA unit. For example, a field worker repairing or working on a piece of equipment as part of a multi-step workflow may receive, at a device, an updated workflow or next step in the workflow based on the current operating condition for the measurable element.

Monitoring the PSA units and the processes using PSA units may include collecting data that may be correlated and used to predict behavior or problems in different PSA units used in the same plant or in other plants and/or processes. Data collected from the various sensors (e.g., measurements such as flow, pressure drop, thermal performance, vessel skin temperature at the top, vibration) may be correlated with external data, such as environmental or weather data. Process changes or operating conditions may be able to be altered to preserve the equipment until the next scheduled maintenance period. Fluids may be monitored for corrosive contaminants and pH may be monitored in order to predict higher than normal corrosion rates within the PSA equipment. At a high level, sensor data collected (e.g., by the data collection platform) and data analysis (e.g., by the data analysis platform) may be used together, for example, for process simulation, equipment simulation, providing or updating a workflow, and/or other tasks. For example, sensor data may be used for process simulation and reconciliation of sensor data. The resulting improved process simulation may provide a stream of physical properties that may be used to calculate heat flow, etc. These calculations may lead to thermal and pressure drop performance prediction calculations for specific equipment, and comparisons of equipment predictions to observations from the operating data (e.g., predicted/expected outlet temperature and pressure vs. measured outlet temperature and pressure). This may enable identification of one or issues that may eventually lead to a potential control changes and/or recommendations, etc.

Sensor data may be collected by a data collection platform 401. The sensors may interface with the data collection platform 401 via wired or wireless transmissions. Sensor data (e.g., temperature data) may be collected continuously or at periodic intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval).

Data may be collected at different locations at different intervals. For example, data at a known hot spot may be collected at a first interval, and data at a spot that is not a known hot spot may be collected at a second interval. The data collection platform 401 may continuously or periodically (e.g., every second, every minute, every hour, every day, once a week, once a month) transmit collected sensor data to a data analysis platform, which may be nearby or remote from the data collection platform.

Figure 4B:
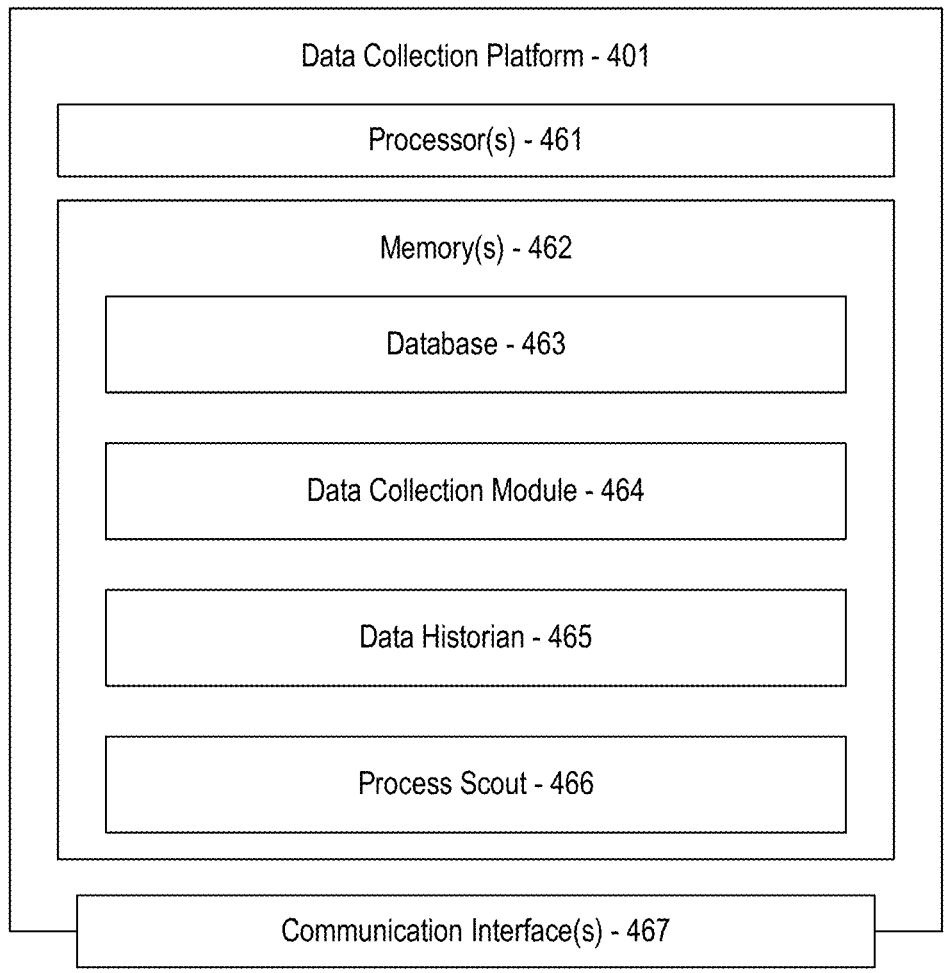
FIG. 4B depicts an illustrative data collection computing platform for collecting data related to the operation of one or more pieces of equipment in a plant in accordance with one or more example embodiments.
Figure 4C:
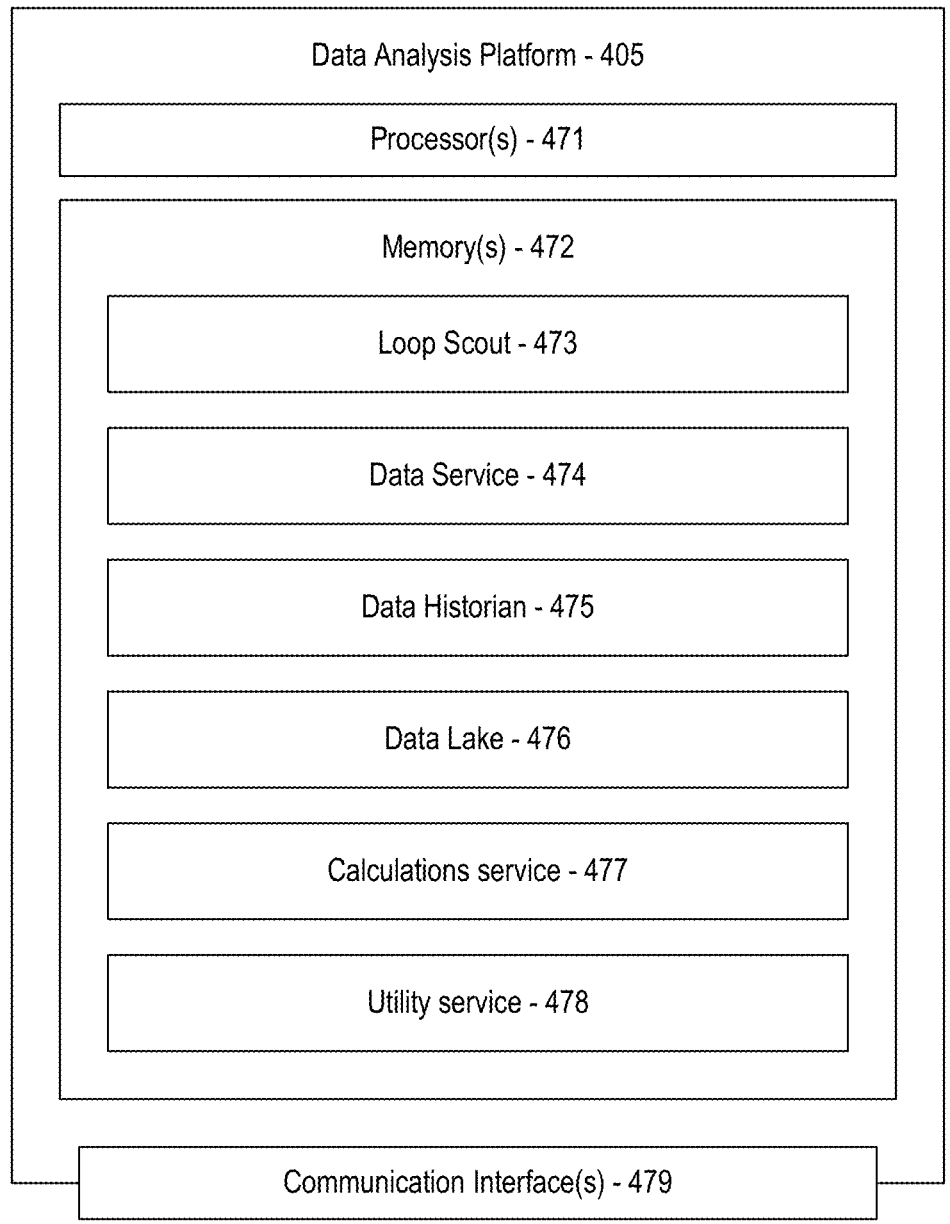
FIG. 4C depicts an illustrative data analysis computing platform for analyzing data related to the operation of one or more pieces of equipment in a plant in accordance with one or more example embodiments.
Figure 4D:
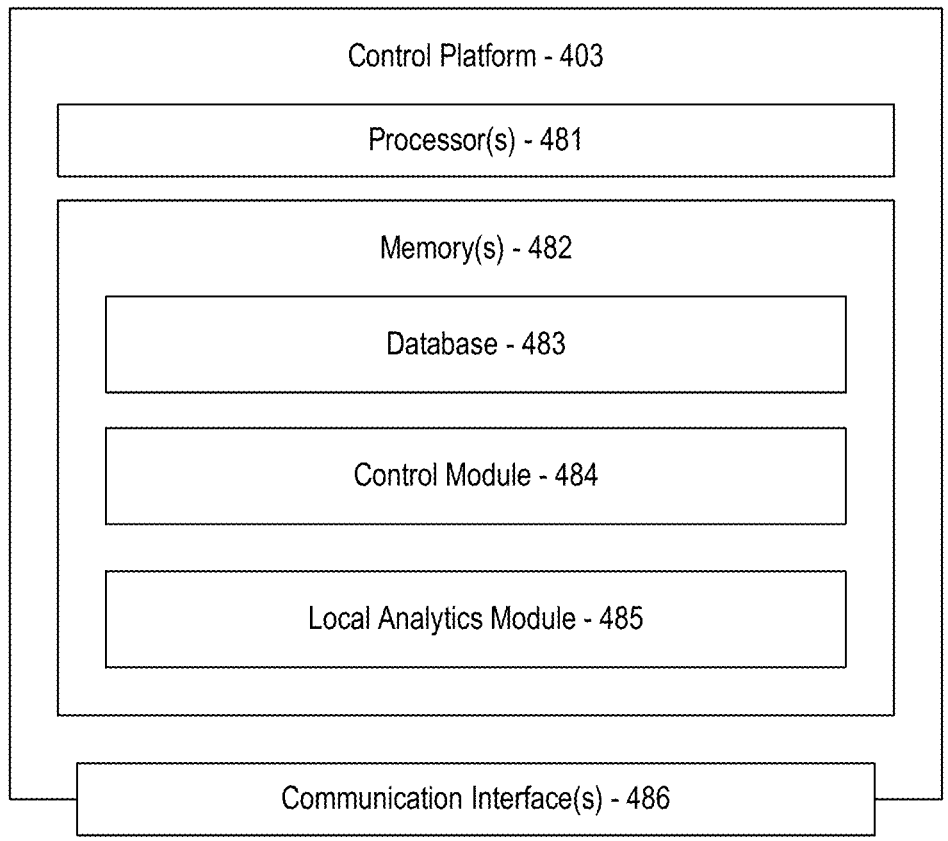
FIG. 4D depicts an illustrative data analysis computing platform for analyzing data related to the operation of one or more pieces of equipment in a plant in accordance with one or more example embodiments.
Figure 4E:
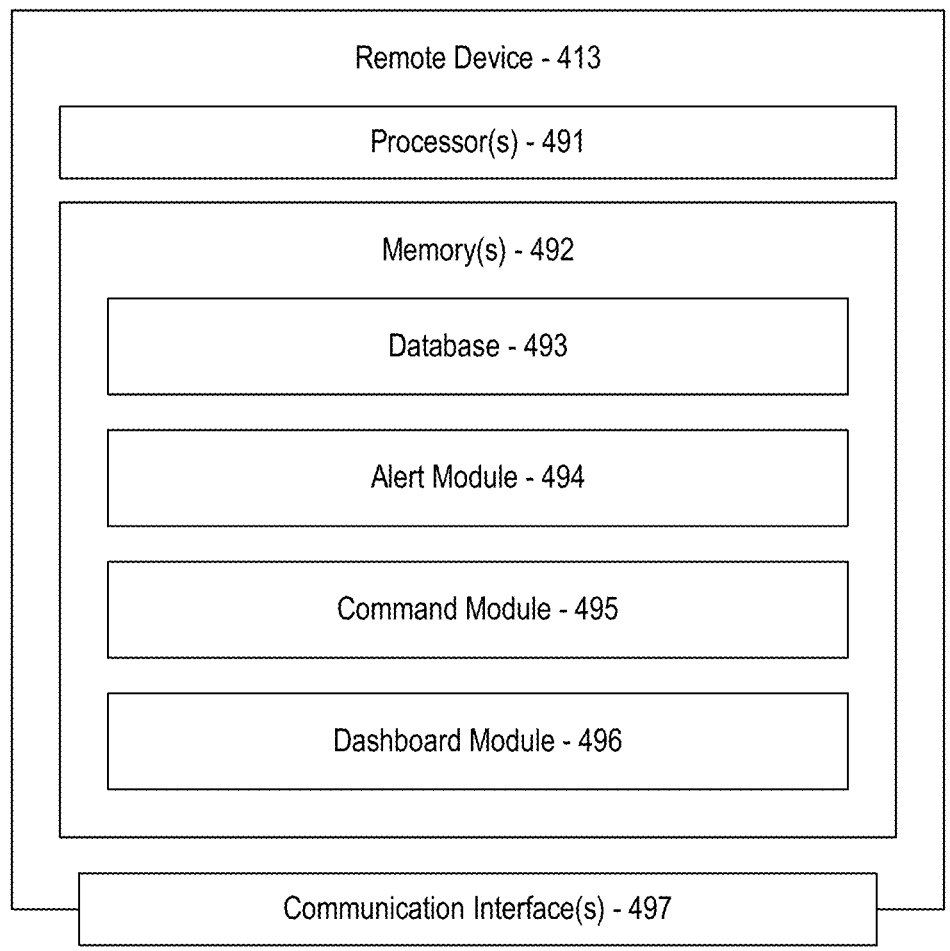
FIG. 4E depicts an illustrative control computing platform for controlling one or more parts of one or more pieces of equipment in a plant in accordance with one or more example embodiments.

The computing system environment 400 of FIG. 4A includes logical block diagrams of numerous platforms and devices that are further elaborated upon in FIG. 4B, FIG. 4C, FIG. 4D, and FIG. 4E. FIG. 4B is an illustrative data collection platform 401, such as a production process data device and/or workflow platform described below. FIG. 4C is an illustrative data analysis platform 405, such as a production process data device described below. FIG. 4D is an illustrative control platform 403, such as a workflow platform described below. FIG. 4E is an illustrative remote device 413 and 415, such as a mobile device. These platforms and devices of FIG. 4 include one or more processing units (e.g., processors) to implement the methods and functions of certain aspects of the present disclosure in accordance with the example embodiments. The processors may include general-purpose microprocessors and/or special-purpose processors designed for particular computing system environments or configurations. For example, the processors may execute computer-executable instructions in the form of software and/or firmware stored in the memory of the platform or device. Examples of well-known computing systems, environments, and/or configurations that may be suitable for use with the disclosed embodiments include, but are not limited to, personal computers (PCs), server computers, hand-held or laptop devices, smart phones, multi-processor systems, microprocessor-based systems, programmable consumer electronics, network PCs, minicomputers, mainframe computers, virtual machines, distributed computing environments that include any of the above systems or devices, and the like.

In addition, the platform and/or devices in FIG. 4 may include one or more memories of a variety of computer-readable media. Computer-readable media may be any available media that may be accessed by the data collection platform, may be non-transitory, and may include volatile and nonvolatile, removable and non-removable media implemented in any method or technology for storage of information such as computer-readable instructions, object code, data structures, database records, program modules, or other data. Examples of computer-readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that may be used to store the desired information and that may be accessed by the data collection platform. The memories in the platform and/or devices may further store modules that may comprise compiled software code that causes the platform, device, and/or overall system to operate in a technologically improved manner as disclosed herein. For example, the memories may store software used by a computing platform, such as operating system, application programs, and/or associated database. Alternatively or additionally, a module may be implemented in a virtual machine or multiple virtual machines.

Furthermore, the platform and/or devices in FIG. 4 may include one or more communication interfaces including, but not limited to, a microphone 443, keypad, touch screen, and/or stylus through which a user of a computer (e.g., a remote device) may provide input, and may also include a speaker for providing audio output and a video display device for providing textual, audiovisual and/or graphical output. The communication interfaces may include a network controller for electronically communicating (e.g., wirelessly or wired) over a public network or private network with one or more other components on the network. The network controller may include electronic hardware for communicating over network protocols, including TCP/IP, UDP, Ethernet, and other protocols.

In some examples, one or more sensor devices in FIG. 4A may be enhanced by incorporating functionality that may otherwise be found in a data collection platform 401. These enhanced sensor system may provide further filtering of the measurements and readings collected from their sensor devices. For example, with some of the enhanced sensor systems in the operating environment 400 illustrated in FIG. 4A, an increased amount of processing may occur at the sensor so as to reduce the amount of data needing to be transferred over a private network 407 in real-time to a computing platform. The enhanced sensor system may filter at the sensor itself the measured/collected/captured data and only particular, filtered data may be transmitted to the data collection platform 401 for storage and/or analysis.

Referring to FIG. 4B, in one example, a data collection platform 401 may comprise a processor 461, one or more memories 462, and communication interfaces 467. The memory 462 may comprise a database 463 for storing data records of various values collected from one or more sources. In addition, a data collection module 464 may be stored in the memory and assist the processor in the data collection platform in communicating with, via the communications interface, one or more sensor, measurement, and data capture systems, and processing the data received from these sources. In some embodiments, the data collection module 464 may comprise computer-executable instructions that, when executed by the processor, cause the data collection platform 401 to perform one or more of the steps disclosed herein. In other embodiments, the data collection module 464 may be a hybrid of software-based and/or hardware-based instructions to perform one or more of the steps disclosed herein. In some examples, the data collection module 464 may assist an enhanced sensor system with further filtering the measurements and readings collected from the sensor devices. In some examples, the data collection module 464 may receive some or all data from a plant or piece of equipment, and/or may provide that data to one or more other modules or servers.

Data collection platform 401 may include or be in communication with one or more data historians 465. The data historian 465 may be implemented as one or more software modules, one or more virtual machines, or one or more hardware elements (e.g., servers). The data historian 465 may collect data at regular intervals (e.g., every minute, every two minutes, every ten minutes, every thirty minutes).

The data historian 465 may include or be in communication with a process scout 466. The process scout 466 may be implemented as one or more software modules, one or more virtual machines, or one or more hardware elements (e.g., servers). The process scout 466 may work with or in place of the data collection module 401 and/or the data historian 465 to handle one or more aspects of data replication.

Although the elements of FIG. 4B are illustrated as logical block diagrams, the disclosure is not so limited. In particular, one or more of the logical boxes in FIG. 4B may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database 463 in FIG. 4B is illustrated as being stored inside one or more memories 462 in the data collection platform 401, FIG. 4B contemplates that the database 463 may be stored in a standalone data store communicatively coupled to the data collection module 401 and processor 461 of the data collection platform 401 via the communications interface(s) 467 of the data collection platform 401.

In addition, the data collection module 464 may assist the processor in the data collection platform 401 in communicating with, via the communications interface 467, and processing data received from other sources, such as data feeds from third-party servers and manual entry at the field site from a dashboard graphical user interface. For example, a third-party server may provide contemporaneous weather data to the data collection module. Some elements of chemical and petrochemical/refinery plants may be exposed to the outside and thus may be exposed to various environmental stresses. Such stresses may be weather related such as temperature extremes (hot and cold), high wind conditions, and precipitation conditions such as snow, ice, and rain. Other environmental conditions may be pollution particulates such as dust and pollen, or salt if located near an ocean, for example. Such stresses may affect the performance and lifetime of equipment in the plants. Different locations may have different environmental stresses. For example, a refinery in Texas will have different stresses than a chemical plant in Montana. In another example, data manually entered from a dashboard 423 and 425 graphical user interface (or other means) may be collected and saved into memory 462 by the data collection module 401. Production rates may be entered and saved in memory. Tracking production rates may indicate issues with flows. For example, as fouling occurs, the production rate may fall if a specific outlet temperature may no longer be achieved at the targeted capacity and capacity has to be reduced to maintain the targeted outlet temperature.

Referring to FIG. 4C, in one example, a data analysis platform 405 may comprise a processor 471, one or more memories 472, and communication interfaces 479. The memory 472 may comprise a database for storing data records of various values collected from one or more sources. Alternatively, the database may be the same database as that depicted in FIG. 4B and the data analysis platform 405 may communicatively couple with the database via the communication interface 479 of the data analysis platform 405. At least one advantage of sharing a database between the two platforms is the reduced memory requirements due to not duplicating the same or similar data.

In addition, the data analysis platform 405 may include a loop scout 473. In some embodiments, the loop scout 473 may comprise computer-executable instructions that, when executed by the processor 471, cause the data analysis platform 405 to perform one or more of the steps disclosed herein. In other embodiments, the loop scout 473 may be a virtual machine. In some embodiments, the loop scout 473 may be a hybrid of software-based and/or hardware-based instructions to perform one or more of the steps disclosed herein.

Further, the data analysis platform 405 may include a data service 474. In some embodiments, the data service 474 may comprise computer-executable instructions that, when executed by the processor 471, cause the data analysis platform 405 to perform one or more of the steps disclosed herein. In other embodiments, the data service 474 may be a virtual machine. In some embodiments, the data service 474 may be a hybrid of software-based and/or hardware-based instructions to perform one or more of the steps disclosed herein.

Also, the data analysis platform 405 may include a data historian 475. In some embodiments, the data historian 475 may comprise computer-executable instructions that, when executed by the processor 471, cause the data analysis platform 405 to perform one or more of the steps disclosed herein. In other embodiments, the data historian 475 may be a virtual machine. In some embodiments, the data historian 475 may be a hybrid of software-based and/or hardware-based instructions to perform one or more of the steps disclosed herein. The data historian 475 may collect data at regular intervals (e.g., every minute, every two minutes, every ten minutes, every thirty minutes).

Additionally, the data analysis platform 405 may include a data lake 476. In some embodiments, the data lake 476 may comprise computer-executable instructions that, when executed by the processor 471, cause the data analysis platform 405 to perform one or more of the steps disclosed herein. In other embodiments, the data lake 476 may be a virtual machine. In some embodiments, the data lake 476 may be a hybrid of software-based and/or hardware-based instructions to perform one or more of the steps disclosed herein. The data lake 476 may perform relational data storage. The data lake 476 may provide data in a format that may be useful for processing data and/or performing data analytics.

Moreover, the data analysis platform 405 may include a calculations service 477. In some embodiments, the calculations service 477 may comprise computer-executable instructions that, when executed by the processor 471, cause the data analysis platform 405 to perform one or more of the steps disclosed herein. In other embodiments, the calculations service 477 may be a virtual machine. In some embodiments, the calculations service 477 may be a hybrid of software-based and/or hardware-based instructions to perform one or more of the steps disclosed herein. The calculations service 477 may collect data, perform calculations, and/or provide performance indicators. The calculations service may implement, for example, process dynamic modeling software or tools (e.g., UniSim).

Furthermore, the data analysis platform 405 may include a utility service 478. In some embodiments, the utility service 478 may comprise computer-executable instructions that, when executed by the processor 471, cause the data analysis platform 405 to perform one or more of the steps disclosed herein. In other embodiments, the utility service 478 may be a virtual machine. In some embodiments, the utility service 478 may be a hybrid of software-based and/or hardware-based instructions to perform one or more of the steps disclosed herein. The utility service 478 may take information from the calculations service 477 and put the information into the data lake 476. The utility service 478 may provide data aggregation service, such as taking all data for a particular range, normalizing the data (e.g., determining an average), and combining the normalized data into a file to send to another system or module.

One or more components of the data analysis platform 405 may assist the processor 471 in the data analysis platform 405 in processing and analyzing the data values stored in the database. In some embodiments, the data analysis platform 405 may perform statistical analysis, predictive analytics, and/or machine learning on the data values in the database to generate predictions and models. For example, the data analysis platform 405 may analyze sensor data to detect new hot spots and/or to monitor existing hot spots (e.g., to determine if an existing hot spot is growing, maintaining the same size, or shrinking) in the equipment of a plant. The data analysis platform 405 may compare temperature data from different dates to determine if changes are occurring. Such comparisons may be made on a monthly, weekly, daily, hourly, real-time, or some other basis.

Referring to FIG. 4C, the data analysis platform 405 may generate recommendations for adjusting one or more parameters for the operation of the plant environment depicted in FIG. 4A. In some embodiments, the data analysis platform 405 may, based on the recommendations, generate command codes that may be transmitted, via the communications interface 479, to cause adjustments or halting/starting of one or more operations in the plant environment. The command codes may be transmitted to a control platform 403 for processing and/or execution. In an alternative embodiment, the command codes may be directly communicated, either wirelessly or in a wired fashion, to physical components at the plant, where the physical components comprise an interface to receive the commands and execute them.

Although the elements of FIG. 4C are illustrated as logical block diagrams, the disclosure is not so limited. In particular, one or more of the logical boxes in FIG. 4C may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database is visually depicted in FIG. 4C as being stored inside one or more memories in the data analysis platform, FIG. 4C contemplates that the database may be stored in a standalone data store communicatively coupled to the processor of the data analysis platform via the communications interface of the data analysis platform. Furthermore, the databases from multiple plant locations may be shared and holistically analyzed to identify one or more trends and/or patterns in the operation and behavior of the plant and/or plant equipment. In such a crowdsourcing-type example, a distributed database arrangement may be provided where a logical database may simply serve as an interface through which multiple, separate databases may be accessed. As such, a computer with predictive analytic capabilities may access the logical database to analyze, recommend, and/or predict the behavior of one or more aspects of plants and/or equipment. In another example, the data values from a database from each plant may be combined and/or collated into a single database where predictive analytic engines may perform calculations and prediction models.

Referring to FIG. 4D, in one example, a control platform 403 may comprise a processor 481, one or more memories 482, and communication interfaces 486. The memory 482 may comprise a database 483 for storing data records of various values transmitted from a user interface, computing device, or other platform. The values may comprise parameter values for particular equipment 427 and 429 at the plant. For example, some illustrative equipment at the plant that may be configured and/or controlled by the control platform include, but is not limited to, a feed switcher, sprayer, one or more valves 429, one or more pumps 427, one or more gates, and/or one or more drains. In addition, a control module 484 may be stored in the memory 482 and assist the processor 481 in the control platform 403 in receiving, storing, and transmitting the data values stored in the database. In some embodiments, the control module 484 may comprise computer-executable instructions that, when executed by the processor 471, cause the control platform 403 to perform one or more of the steps disclosed herein. In other embodiments, the control module 403 may be a hybrid of software-based and/or hardware-based instructions to perform one or more of the steps disclosed herein.

The control platform 403 may include a local analytics module 485. In some embodiments, a control program (e.g., that runs PSA processes) may include an embedded analytics module. Calculating analytics locally (e.g., rather than remotely on the cloud) may provide some benefits, such as increased response time for providing real-time information to local plant systems. For example, if a thousand valves that open and close 10 times a second are each providing operating information to the local control platform, the sheer volume of data may introduce a delay in calculating short-term maintenance-required calculations, analytics, or alerts if there is not sufficient bandwidth between the plant and the remote cloud processing system. Thus, a subset of the analytics data (e.g., analytics data relevant to realtime operating information, equipment for which a delayed failure alert may result in a catastrophic failure, or the like) may be processed and provided locally, while other data (e.g., analytics data related to long-time trends, historical analytics data, or the like) may be sent to a cloud platform for processing. In some embodiments, all the data is sent to the cloud, including the data that is processed locally. The data processed locally may be used for providing realtime information, such as alerts, control system changes, and/or updating workflows, and sent to the cloud for logging, storage, long-term or historical trends analysis, or the like. The local version of the data may be discarded after a certain time period. Local and/or cloud data may be combined on a dashboard 423 and 425, or alternatively may be provided on separate dashboards 423 and 425.

In a plant environment such as illustrated in FIG. 4A, if sensor data is outside of a safe range, this may be cause for immediate danger. As such, there may be a real-time component to the system such that the system processes and responds in a timely manner. Although in some embodiments, data may be collected and leisurely analyzed over a lengthy period of months, numerous embodiments contemplate a real-time or near real-time responsiveness in analyzing and generating alerts, such as those generated or received by the alert module in FIG. 4E.

Referring to FIG. 4E, in one example, a remote device 413 may comprise a processor 491, one or more memories 492, and communication interfaces 497. The memory 492 may comprise a database 493 for storing data records of various values entered by a user or received through the communications interface 497. In addition, an alert module 494, command module 495, and/or dashboard module 496 may be stored in the memory 492 and assist the processor 491 in the remote device 413 in processing and analyzing the data values stored in the database 493. In some embodiments, the aforementioned modules may comprise computer-executable instructions that, when executed by the processor 491, cause the remote device 413 to perform one or more of the steps disclosed herein. In other embodiments, the aforementioned modules may be a hybrid of software-based and/or hardware-based instructions to perform one or more of the steps disclosed herein. In some embodiments, the aforementioned modules may generate alerts based on values received through the communications interface 497. The values may indicate a dangerous condition or even merely a warning condition due to odd sensor readings. The command module 495 in the remote device 413 may generate a command that when transmitted through the communications interface 497 to the platforms at the plant, causes adjusting of one or more parameter operations of the plant environment depicted in FIG. 4A. In some embodiments, the dashboard module 496 may display a graphical user interface to a user of the remote device 413 to enable the user to enter desired parameters and/or commands. These parameters/commands may be transmitted to the command module to generate the appropriate resulting command codes that may be then transmitted, via the communications interface 496, to cause adjustments or halting/starting of one or more operations in the plant environment (e.g., updating one or more workflows). The command codes may be transmitted to a control platform 403 for processing and/or execution. In an alternative embodiment, the command codes may be directly communicated, either wirelessly or in a wired fashion, to physical components at the plant such that the physical components comprise an interface to receive the commands and execute them.

Although FIG. 4E is not so limited, in some embodiments the remote device 413 may comprise a desktop computer, a smartphone, a wireless device, a tablet computer, a laptop computer, and/or the like. The remote device may be physically located locally or remotely, and may be connected by one of communications links to the public network 409 that is linked via a communications link to the private network 407. The network used to connect the remote device 413 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links may be any communications links suitable for communicating between workstations and server, such as network links, dial-up links, wireless links, hard-wired links, as well as network types developed in the future, and the like. Various well-known protocols such as transmission control protocol/Internet protocol (TCP/IP), Ethernet, file transfer protocol (FTP), hypertext transfer protocol (HTTP) and the like may be used, and the system may be operated in a client-server configuration to permit a user to retrieve web pages from a web-based server. Any of various conventional web browsers may be used to display and manipulate data on web pages.

Although the elements of FIG. 4E are illustrated as logical block diagrams, the disclosure is not so limited. In particular, one or more of the logical boxes in FIG. 4E may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database is visually depicted in FIG. 4E as being stored inside one or more memories in the remote device, FIG. 4E contemplates that the database 493 may be stored in a standalone data store communicatively coupled, via the communications interface 496, to the modules stored at the remote device 413 and processor 491 of the remote device 413.

Referring to FIG. 4, in some examples, the performance of operation in a plant may be improved by using a cloud computing infrastructure and associated methods. The methods may include, in some examples, obtaining plant operation information from the plant and/or generating a plant process model using the plant operation information. The method may include receiving plant operation information over the Internet, or other computer network (including those described herein) and automatically generating a plant process model using the plant operation information. These plant process models may be configured and used to monitor, predict, and/or optimize performance of individual process units, operating blocks and/or complete processing systems. Routine and frequent analysis of predicted versus actual performance may further allow early identification of operational discrepancies which may be acted upon to optimize impact, including financial or other impact.

At the stack level, the cloud-computing infrastructure may provide a secure, scalable infrastructure for collecting, aggregating and storing data, allowing connected "things" to communicate, making an offering/SaaS solution available, IaaS/PaaS, and/or data lakes. Different devices, systems, and/or platforms may be connected via the cloud or direct, remote connection (e.g., Lyric Thermostat, SaaS). Furthermore, the disclosure may include infrastructure enabling connected services (e.g., Sentience). The aforementioned cloud computing infrastructure may use a data collection platform (such as process scout) associated with a plant to capture data, e.g., sensor measurements, which may be automatically sent to the cloud infrastructure, which may be remotely located, where it is reviewed to, for example, eliminate errors and biases, and used to calculate and report performance results. The data collection platform may include an optimization unit that acquires data from a customer site, other site, and/or plant (e.g., sensors and other data collectors at a plant) on a recurring basis. For cleansing, the data may be analyzed for completeness and corrected for gross errors by the optimization unit. The data may also be corrected for measurement issues (e.g., an accuracy problem for establishing a simulation steady state) and overall mass balance closure to generate a duplicate set of reconciled plant data. The corrected data may be used as an input to a simulation process, in which the process model is tuned to ensure that the simulation process matches the reconciled plant data. An output of the reconciled plant data may be used to generate predicted data using a collection of virtual process model objects as a unit of process design.

The performance of the plant and/or individual process units of the plant is/are compared to the performance predicted by one or more process models to identify any operating differences or gaps. Furthermore, the process models and collected data (e.g., plant operation information) may be used to run optimization routines that converge on an optimal plant operation for a given values of, e.g., feed, products, and/or prices. A routine may be understood to refer to a sequence of computer programs or instructions for performing a particular task.

The data analysis platform may comprise an analysis unit that determines operating status, based on at least one of a kinetic model, a parametric model, an analytical tool, and a related knowledge and best practice standard. The analysis unit may receive historical and/or current performance data from one or a plurality of plants to proactively predict future actions to be performed. To predict various limits of a particular process and stay within the acceptable range of limits, the analysis unit may determine target operational parameters of a final product based on actual current and/or historical operational parameters. This evaluation by the analysis unit may be used to proactively predict future actions to be performed. In another example, the analysis unit may establish a boundary or threshold of an operating parameter of the plant based on at least one of an existing limit and an operation condition. In yet another example, the analysis unit may establish a relationship between at least two operational parameters related to a specific process for the operation of the plant. Finally in yet another example, one or more of the aforementioned examples may be performed with or without a combination of the other examples.

The plant process model may predict plant performance that is expected based upon plant operation information. The plant process model results may be used to monitor the health of the plant and to determine whether any upset or poor measurement occurred. The plant process model may be generated by an iterative process that models at various plant constraints to determine the desired plant process model.

Further, the analytics unit may be partially or fully automated. In one embodiment, the system is performed by a computer system, such as a third-party computer system, remote from or local to the plant and/or the plant planning center. The system may receive signals and parameters via the communication network, and displays in real time (or near real time) related performance information on an interactive display device accessible to an operator or user. The platform allows all users to work with the same information, thereby creating a collaborative environment for sharing best practices or for troubleshooting. The method further provides more accurate prediction and optimization results due to fully configured models. Routine automated evaluation of plant planning and operation models allows timely plant model tuning to reduce or eliminate gaps between plant models and the actual plant performance. Implementing the aforementioned methods using the platform also allows for monitoring and updating multiple pieces of equipment, thereby better enabling facility planners to propose realistic optimal targets.

Some proposals for large-scale marker-less asset identification in an augmented reality application typically require the location and orientation of a user's device to be accurately determined relative to the asset being viewed. However, the accuracy of location technology such as Global Positioning System (GPS) or short-link radio technology, such as Bluetooth, location beacons are only good to 5 to 150 meters or 1 to 2 meters respectively. Neither of these is accurate enough to provide an augmented view of assets in an industrial plant setting. GPS estimation of height, required for multi-story facilities, is even less accurate than latitude and longitude.

Fiducial marker-based techniques, on the other hand, may provide a more accurate estimate of device's position and orientation relative to a marker (approximately 10 cm). Aspects of the present disclosure use a single fiducial marker at a known location to provide an initial estimate of a user device's location in space. Movement of the user device from that initial position is then tracked using a dead-reckoning technique, such as Visual Inertial Odometry. The current position and orientation of the user device as determined by the dead-reckoning technique is combined with accurate knowledge of the position of assets in the vicinity of the marker (absolute or relative to the location of the marker) to determine what assets are in view so that they can be augmented with the correct asset-related information.

Such a technique need not rely on external sources of location information such as GPS or the addition of location beacons to the assets in the environment that are costly to install and maintain. By switching to a single marker per asset area, the user saves time and expense that would be spent manually affixing the markers to each asset, as well as maintenance costs associated with markers placed in outdoor and other extreme conditions encountered in industrial plants. It also means that the view of an asset can be augmented from a distance or angle from which a marker placed on an asset may not be visible.

Accompanying an augmented reality approach based on data on the location of assets is a need to provide a way to accurately determine the location of assets. One manner uses a three dimensional (3D) model of an industrial plant or area within the industrial plant, to determine the location of assets within the plant or area. Once a 3D model of an industrial plant, or area within, has been accurately located with respect to the location of a single marker, the location of all assets in the plant or area can be determined from the model. This approach allows the location of assets to be accurately determined without having to visit the actual assets in the plant as would be the case if a GPS receiver were to be used to determine the location of an asset. This approach alleviates the problem that GPS signals are often not available in many parts of an industrial plant due to the nature of the physical plant or inherent physical structures that can interfere with GPS signals. This approach alleviates the accuracy issues associated with GPS location which can vary significantly even when GPS signals are available. This approach also addresses the situation in which many assets are located at various heights above ground level, whereas GPS altitude readings are rarely accurate enough to distinguish between locations separated by several meters. Finally, a two-dimensional (2D) map of a refinery plant is rarely detailed enough to allow for identification of individual plant assets and does not help with assets located above ground level.

An approach based on a 3D model of an industrial plant allows the location of individual assets to be identified in a virtual walkthrough of the plant in a virtual reality (VR) environment. A user simply needs to select individual assets in the model to associate a unique asset identifier with the location of the asset derived from the 3D model in 3-dimensional space (latitude, longitude, elevation). This approach allows for the identification of an asset's location to be quick and easily done without having to visit actual assets in the industrial plant, thus saving significant amounts of time to engineer an augmented reality solution for physical assets. This approach further avoids any safety risks associated with physically entering the industrial plant, especially for hard to access assets. Finally, ongoing maintenance of location data is much easier in a virtual environment than in the physical plant environment.

Figure 6:
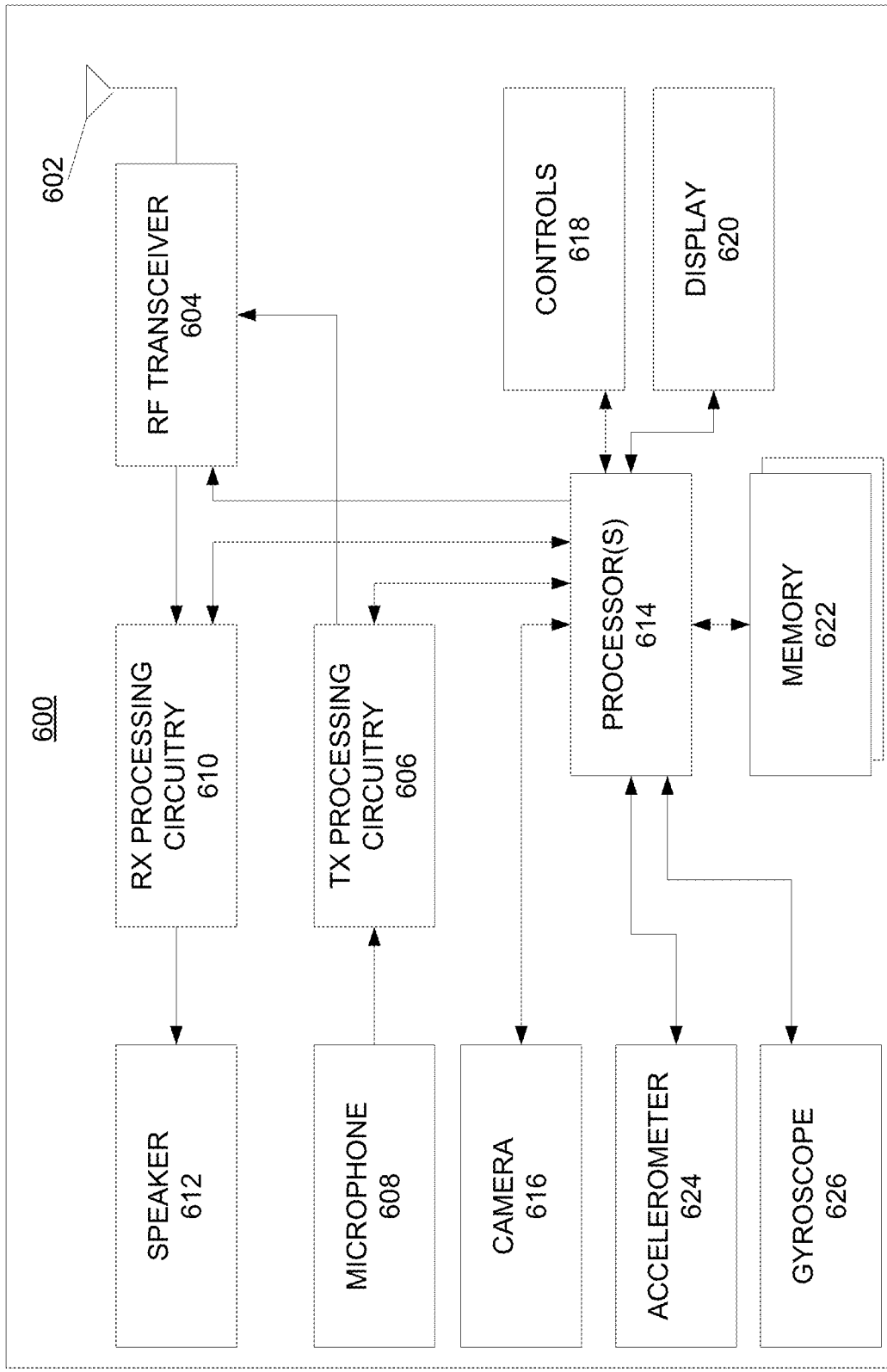
FIG. 6 depicts an illustrative example computing device supporting augmented reality views of assets in a petrochemical or other industrial plant according to this disclosure.

FIG. 5 depicts an illustrative computing environment for managing the operation of one or more pieces of equipment in a plant in accordance with one or more example embodiments. FIG. 5 is but one illustrative computing environment and one or more components of the same may be duplicated, combined and/or removed while other similar components may be added. FIG. 5 shows a client device 501. Client device 501 may be a mobile computing device, such as a mobile phone and/or tablet computing device. Mobile device 600 in FIG. 6 is one such example. Client device 501 may be a mobile wireless electronic device utilized by a field worker in a petrochemical or industrial plant for implementing one or more tasks associated with one or more plant assets 509, 511, 513, such as a PSA unit, a pipeline, and/or a feed valve. Client device 501 is shown in communication with a backend server 503. Backend server 503 may be one or more computing devices, such as data analysis platform 405 (e.g., a cloud computing platform) shown in FIG. 4C. Backend server 503 may comprise any form of device configured with one or more processors and/or memory storing instructions that, when executed by the processor, perform one or more steps. Backend server 503 may be one or more database servers, file servers, and application servers that process service requests from user devices, such as client device 501, databases, such as database 505, and/or other servers.

Backend server 503 is shown in communication with a database 505. Database 505 is but one database and backend server 503 may be in communication with more than one database 505. Database 505 may be one or more computing devices, such as data collection platform 401 in FIG. 4B. Database 505 may comprise any form of device configured with one or more processors and/or memory storing instructions that, when executed by the processor, perform one or more steps. Database 505 may be configured to store an index. Such an index may include any of a number of types of data. Example data in such an index includes identification data of a fiducial marker. The identification may include a name, serial number, fiducial marker number, and/or other form of identification of the fiducial marker. Each fiducial marker includes its own identification. The index also includes known location data, e.g., three-dimensional position and orientation, of the fiducial marker within a petrochemical plant or refinery. A fiducial marker may be used to define a particular area of the petrochemical or industrial plant. Fiducial marker 507 is one such example. Fiducial marker 507 is a known pattern and has a known position and orientation within an area of the plant and thus may serve as a real world anchor of location, orientation, and even scale. Fiducial marker 507 may establish the identity of the area 520 or plant assets 509, 511, 513 within the area 520.

The index in database 505 also may be configured to store the identification of each of one or more assets (e.g., assets 509, 511, and 513) of the industrial plant that are within a predetermined vicinity, e.g., area 520, of the fiducial marker 507. The identification may include a name, serial number, asset number, and/or other form of identification of the asset. Each asset includes its own identification. As such, the index maintains identification data for each of the assets within the area 520 of the fiducial marker 507. The index also may include known location data, e.g., three-dimensional position, of each asset. The known location data of an asset may be a physical measurement taken with respect to a particular portion of the asset and/or may be based upon a three-dimensional model of the industrial plant and the assets located therein. As described herein, such a model may exist from the design and construction phase of the industrial plant.

The index in database 505 further may be configured to store, for each asset, associated information to be displayed in an augmented reality application with the asset when in field of view of a user device, such as client device 501 in area 520, utilizing the augmented reality application. Associated information may include data representing one or more operating values for a measureable element of an asset, such as asset 509. For example, the associated information for an asset may include a name for the asset and a measured pressure value associated with the asset. In other examples, associated information may include a temperature value, a flow speed, a volume level, and/or other operating value of a measurable element. When rendering an augmented view of an asset on a display device of a client device 501, the associated information of an identification of the asset and a pressure reading of the asset may be rendered, such as shown in graphical user interface 1011 in FIG. 10 for asset A 1001.

FIG. 6 depicts an illustrative example computing device supporting augmented field workflows to an industrial process, control and automation system, or other systems according to this disclosure. In particular, FIG. 6 illustrates an example mobile device 600. The mobile device 600 may be used to implement one or more mobile workflows by a field workers. A mobile workflow may represent a scheduled series of actions a field worker may utilize to complete a task associated with an asset. For example, a task may be to perform a maintenance operation on a particular asset, such as a PSA unit or a particular gas pipeline. Mobile device 600 may be used to support the generation or presentation of step-by-step actions (such as by providing operational, diagnostic, or other data to the mobile device 600) for performing the required maintenance. For ease of explanation, the mobile device 600 may be used in the system 100 of FIG. 1 and client device 501 in FIG. 5, although the mobile device 600 may be used in any other suitable system (whether or not related to industrial process control and automation). In one example, by utilizing an augmented reality application, mobile device 600 allows for a worker to receive asset-related information for assets that are in a field of view of the mobile device 600 and have the assets augmented with the correct asset-related information.

As shown in FIG. 6, the mobile device 600 includes an antenna 602, a radio frequency (RF) transceiver 604, transmit (TX) processing circuitry 606, a microphone 608, receive (RX) processing circuitry 610, and a speaker 612. The mobile device 600 also may include a one or more processors 614, a camera 616, one or more physical controls 618, a display 620, one or more memories 622, an accelerometer 624, and a gyroscope 626.

The RF transceiver 604 receives, from the antenna 602, an incoming RF signal, such as a cellular, WiFi, and/or BLUETOOTH signal. The RF transceiver 604 down-converts the incoming RF signal to generate an intermediate frequency (IF) or baseband signal. The IF or baseband signal is sent to the RX processing circuitry 610, which generates a processed baseband signal by filtering, decoding, and/or digitizing the baseband or IF signal. The RX processing circuitry 610 may transmit the processed baseband signal to the speaker 612 or to the processor 614 for further processing.

The TX processing circuitry 606 receives analog or digital data from the microphone 608 or other outgoing baseband data from the processor 614. The TX processing circuitry 606 encodes, multiplexes, and/or digitizes the outgoing baseband data to generate a processed baseband or IF signal. The RF transceiver 604 receives the outgoing processed baseband or IF signal from the TX processing circuitry 606 and up-converts the baseband or IF signal to an RF signal that is transmitted via the antenna 602.

The processor 614 may include one or more processors or other processing devices and execute an operating system, applications, or other logic stored in the memory 622 in order to control the overall operation of the mobile device 600. For example, the processor 614 may control the transmission and reception of signals by the RF transceiver 604, the RX processing circuitry 610, and the TX processing circuitry 606 in accordance with well-known principles. In some embodiments, the processor 614 includes at least one microprocessor or microcontroller, although other types of processing devices may also be used.

The processor 614 is also capable of executing other processes and applications resident in the memory 622. For example, processor 614 may receive a mobile workflow via the RF transceiver 604 and store the mobile workflow in memory 622. The processor 614 may move data into or out of the memory 622 as required by an executing application, e.g., a mobile workflow with augmented reality capability. The processor 614 is also coupled to the camera 616, which provides data to the processor 614 for the generation of digital images or video streams. The images or video streams may be presented to a user via the display 620.

The processor 614 is also coupled to the physical controls 618 and the display 620. A user of the mobile device 600 may use the physical controls 618 to invoke certain functions, such as powering on or powering off the device 600, controlling a volume of the device 600, and inputting measured values, such as pressure, temperature, or flow rate. The display 620 may be a liquid crystal display (LCD), light emitting diode (LED) display, or other display capable of rendering text and graphics. If the display 620 denotes a touchscreen capable of receiving input, fewer or no physical controls 618 may be needed.

Figure 9:
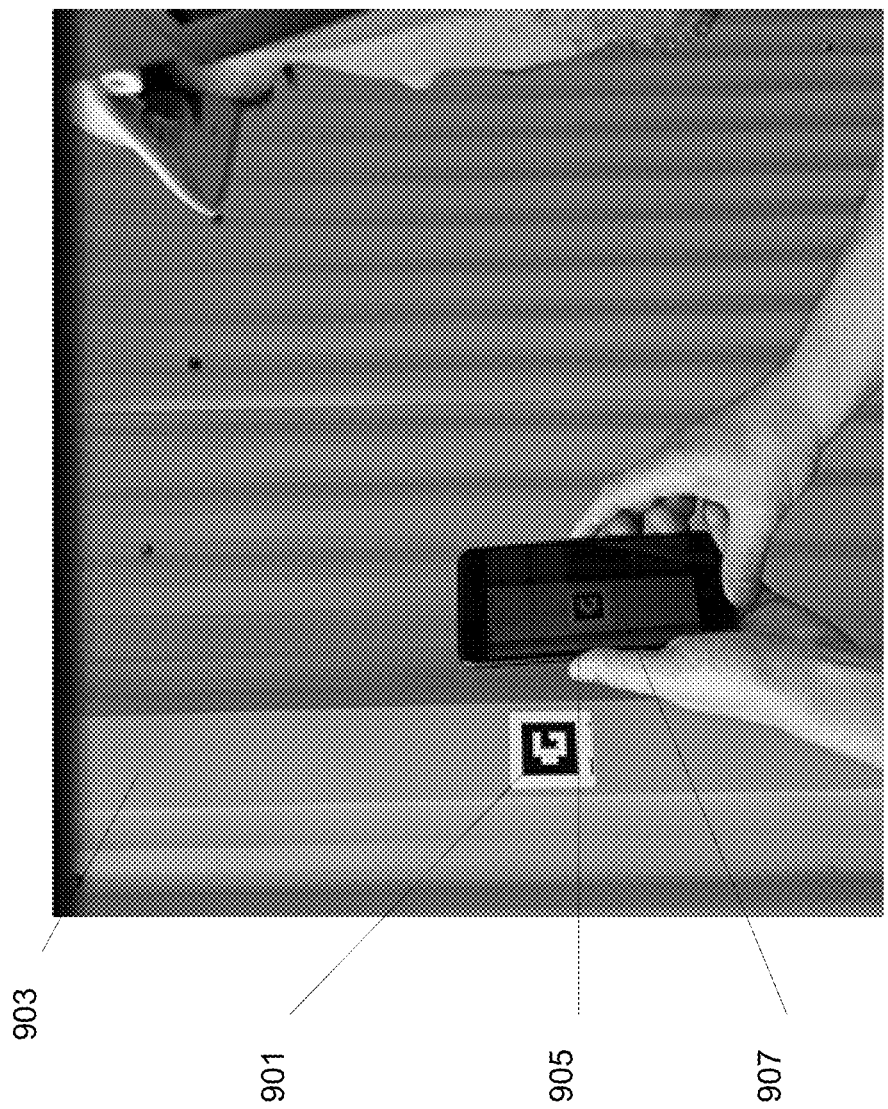
FIG. 9 depicts an illustrative user interface for viewing information and/or scanning fiducial markers related to one or more aspects of a plant operation in accordance with one or more example embodiments.
Figure 10:
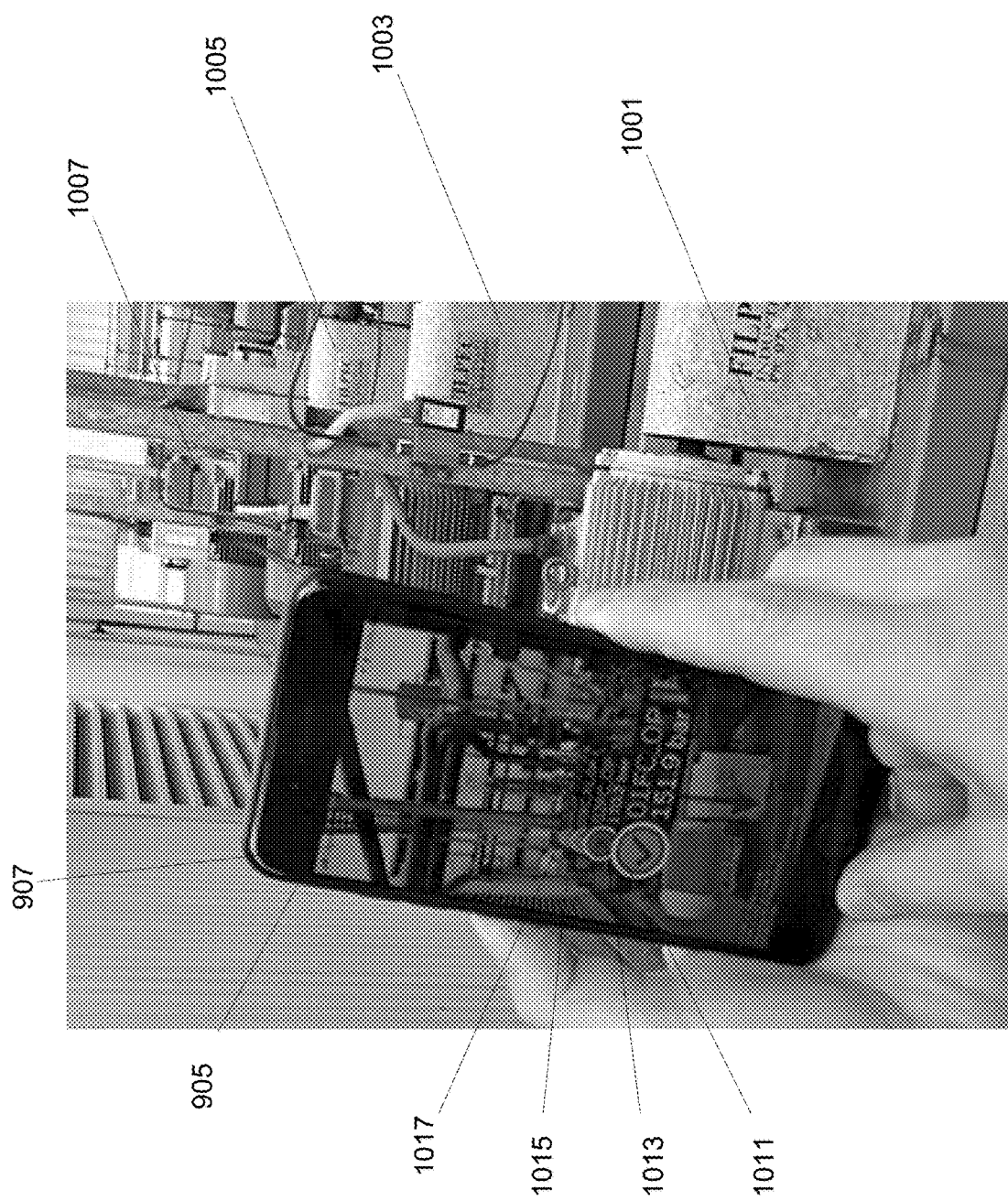
FIG. 10 depicts an illustrative augmented reality view user interface in an industrial plant environment in accordance with one or more example embodiments.

The camera 616 sends captured image data to the processor 614 and may receive instructions for operation from the processor 614. The camera 616 may include a lens through which a field of view of the camera may be visible. The field of view is that part of the world that is visible through the camera 616 at a particular position and orientation in space. Objects outside the field of view are not recorded in a rendered image. It may be expressed as the angular size of the view cone, as an angle of view. Rendered image 907 shown in FIGS. 9 and 10 illustrate the captured and rendered view of a camera. Movement of the mobile device 600 changes the field of view of camera 616. Any such change may be in any one or more distances of a three dimensional space. Accordingly a worker may use mobile device 600 to capture images of and render one or more assets within a field of view of camera 616. FIG. 9 shows use of a mobile device 905 capturing an image of a fiducial marker 901 and rendering the image 907 since the fiducial marker 901 is within the field of view of the camera of the mobile device 905. FIG. 10 shows use a mobile device 905 capturing an image of multiple assets A 1001, B 1003, C 1005, and N 1007 and rendering the image 907 since the assets are within the field of view of the camera of the mobile device 905.

The accelerometer 624 sends measured data to the processor 614 and may receive instructions for operation from the processor 614. The accelerometer 624 may be used to ensure that images on display 620 are displayed upright. Mobile device 600 may include one or more accelerometers 624 for user interface control. The accelerometer 624 may be used to present landscape or portrait views of the mobile device's display 620, based on the way the mobile device 600 is being held. In addition to orientation view adjustment, the accelerometer 624 in mobile device 600 may be used as a pedometer in conjunction with one or more applications. Mobile device 600 also may include a tilt sensor (not shown) for the purpose of auto image rotation and motion-sensitive applications. The accelerometer 624 may measure proper acceleration, the physical acceleration experienced by the mobile device 600, which is also known as the rate of change of velocity of the mobile device 600. The accelerometer 624 may be a single-axis or multi-axis accelerometer used to detect magnitude and direction of the proper acceleration and may be used to sense orientation. The accelerometer 624 may be a microelectromechanical systems (MEMS) type accelerometer. As described herein, processor 614 and one or more accelerometers 624 may be used continuously to calculate via dead reckoning the position, orientation, and velocity (direction and speed of movement) of a moving mobile device 600 without the need for additional external references beyond a single fiducial marker, such as fiducial marker 901 in FIG. 9.

The gyroscope 626 sends measured data to the processor 614 and may receive instructions for operation from the processor 614. The gyroscope 626 may be one or more gyroscope used for measuring or maintaining orientation and/or angular velocity. The gyroscope 626 may be a microchip-packaged MEMS type gyroscope to provide either analog or digital outputs. In some configurations, a MEMS type gyroscope includes gyroscopic sensors for multiple axes. In other configurations, multiple gyroscopes and accelerometers, such as accelerometer 624 (or multiple-axis gyroscopes and accelerometers) may be used together to achieve output that has six full degrees of freedom. Data from the gyroscope 626 may be used by processor 614 to calculate orientation and rotation of mobile device 600.

The memory 622 is coupled to the processor 614. Part of the memory 622 may include a random access memory (RAM), and another part of the memory 622 may include a Flash memory or other read-only memory (ROM). Each memory 622 includes any suitable structure for storing and facilitating retrieval of information.

Figure 7:
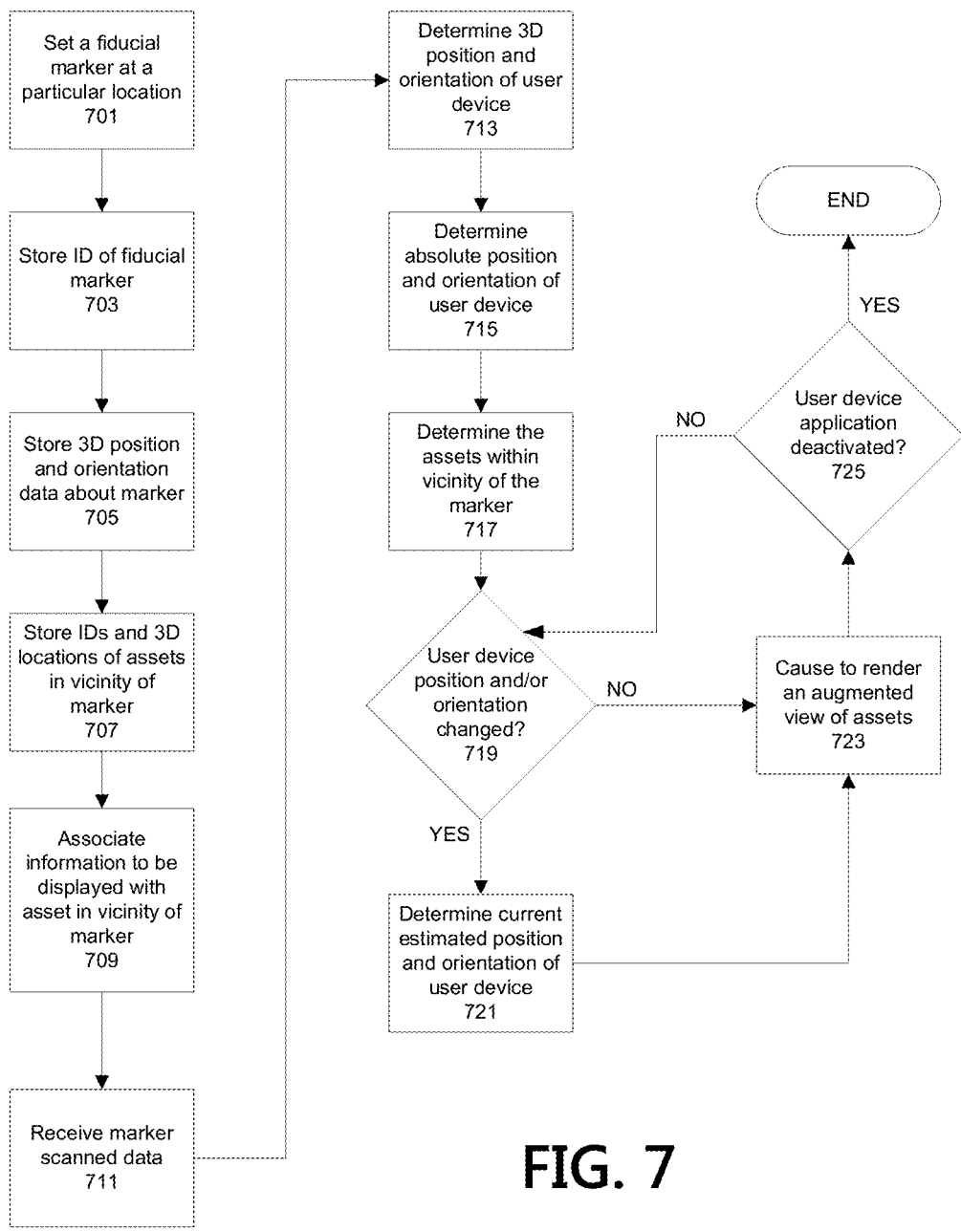
FIG. 7 depicts an illustrative flow diagram of one or more steps that one or more devices may perform in controlling one or more aspects of a plant operation in accordance with one or more example embodiments.

FIG. 7 depicts an illustrative data flow of one or more steps that one or more devices may perform in controlling one or more aspects of a plant operation in accordance with one or more example embodiments described herein. At step 701, a fiducial marker may be set at a predetermined location within a petrochemical refinery or plant. Such a fiducial marker may be fiducial marker 507 shown in FIG. 5. FIG. 9 illustrates and example fiducial marker 901. Fiducial marker 901 is shown to be located on a wall 903 at a particular 3D position and oriented to face a certain direction, such as northwest or 157.2° from true north. The predetermined location that the fiducial marker is set may be a certain area of the refinery or plant in which a plurality of assets of the plant is located. The assets may be of a variety of types of assets that may have a variety of shapes and sizes. In many instances, assets can be positioned very close to each other with many have the same general appearance. FIG. 10 illustrates four assets—asset A 1001, asset B 1003, asset C 1005, and asset N 1007—that appear very similar in appearance but are different assets of the plant.

Proceeding to step 703, identification data of the fiducial marker may be stored. The identification data of the fiducial marker may be stored in an index in a database, such the index stored in database 505 of FIG. 5. At step 705, a three-dimensional position and orientation of the fiducial marker may be stored. The three-dimensional position and orientation of the fiducial marker also may be stored in an index in a database, such the index stored in database 505 of FIG. 5. The three-dimensional position provides a specific point for location of the fiducial marker within an area of the petrochemical refinery or plant. The orientation provides a specific reference for a direction of the fiducial marker, such as fiducial marker 901 oriented against wall 903 in FIG. 9.

In step 707, identification data of a plurality of assets within a predetermined vicinity of the fiducial marker is stored. In addition, for each of the plurality of assets, data representative of a three-dimensional position of the asset also may be stored. This identification data and data representative of the three-dimensional position of the asset may be stored in an index in a database, such the index stored in database 505 of FIG. 5. Moving to step 709, for each of the plurality of assets noted in step 707, information that is to be displayed in an augmented reality application with the asset is associated in a database. The database may be the database 505 of FIG. 5. The information that is to be displayed may be one or more icons, graphical user interfaces, animations, and/or other rendered image that overlays on top of an image captured and rendered on a mobile device, such as client device 501 and/or mobile device 905. In addition, the associated information that is to be displayed may be a measured value, such as a pressure reading of the asset. For example, FIG. 10 shows a mobile device 905 with a rendered image 907 on the display of the mobile device. Rendered image 907 shows an image captured by a camera of the mobile device 905 with a graphical user interface overlaid on top to create an augmented reality environment. In the example shown, asset B 1001 is captured in rendered image 907 as the image element 1021 shown in FIG. 10. Just above the image element 1021 is a graphical user interface 1011 showing a measured pressure for asset A 1001, in this example, 151.9 bar. Also shown is an identification of asset A 1001. In the rendered image 907, the identification of asset A 1001 is shown in the graphical user interface just above the pressure reading as 01FC_OP. Thus, returning to step 709, the information that is to be displayed in the augmented reality application with the asset may be the identification of the asset as well as a measurable element, e.g., pressure reading, of the asset.

Proceeding to step 711, data representative of a user device scanning the fiducial marker may be received. The data may include the identification of the fiducial marker. FIG. 9 illustrates mobile device 905 scanning fiducial marker 901 in a petrochemical refinery or plant. Step 711 may be performed by a mobile device having a camera to capture an image of the fiducial marker, such as mobile device 905 capturing an image of fiducial marker 901. In step 713, a three-dimensional position and an orientation of the user device relative to the fiducial marker may be determined. One or more sensors within the mobile device may provide the position and orientation with respect to the fiducial marker. Alternatively, the position and orientation may be determined relative to the fiducial marker by processing utilizing the image captured in the scan of the fiducial marker. This processing may be done on a device, such as a mobile phone, using algorithms such as homography decomposition and/or orthogonal iteration.

Moving to step 715, an absolute position and an absolute orientation of the mobile device may be determined based upon the determined three-dimensional position and the determined orientation of the user device relative to the fiducial marker in step 713 and the data representative of the three-dimensional position and the orientation of the fiducial marker stored in step 705. The manner in which to determine the absolute position and absolute orientation of the mobile device in step 715 may be done by various algorithms. Such an algorithm may include applying a coordinate transformation to the absolute position and orientation of the marker. This coordinate transformation may be derived from the position and orientation of the device relative to the marker.

In step 717, the identifications of the plurality of assets within the predetermined vicinity of the fiducial marker may be determined. One manner for this determination is by using the data stored in an index in a database, such as the data stored in step 707 for an index in database 505. For example in FIG. 5, three assets, 509, 511, and 513, may have stored data of their identifications in database 505 since they are within area 520, the predetermined vicinity of fiducial marker 507. Moving to step 719, a determination may be made as to whether the user device that scanned the fiducial marker in step 711 has changed its three-dimensional position and/or orientation. For example, as shown in FIG. 9, mobile device 905 scanned fiducial marker 901 and its absolute position and orientation was determined. Then the mobile device 905, as shown in FIG. 10, has changed position and orientation to capture an image 907. If the user device has changed position and/or orientation in step 719, the process moves to step 721, else, the process moves to step 723.

In step 721, a current estimated three-dimensional position and a current estimated orientation of the user device may be determined. On manner for such a determination may be by using a dead-reckoning technique based upon the determined absolute position and the determined absolute orientation of the user device from step 715. Visual Inertial Odometry is one such dead-reckoning technique where an inertial measurement unit, such as in a tablet or smart phone including one or more accelerometers and gyroscopes, may provide odometry information for sudden movements across small time intervals. Such an inertial measurement unit may measure and report a mobile device's specific force, angular rate, and/or the magnetic field surrounding the body, using a combination of accelerometers, gyroscopes, and/or magnetometers. The current estimated position and orientation of the user device as determined by the dead-reckoning technique may be combined with accurate knowledge of the position of assets in the vicinity of the fiducial marker to determine what assets are in view so that they can be augmented with the correct asset-related information.

In step 723, an augmented view of one or more of the assets within the area of the fiducial marker may be rendered on a display of the mobile device. For example, rendered image 907 in FIG. 10 on mobile device 905 is one such example. Reference element 1011 is a graphical user interface rendered on the display. Image element 1021 shows the captured image of asset A 1001 with graphical user interface 1011 shown above it on the display. The augmented view may be rendered based upon the determined current estimated three-dimensional position and current estimated orientation of the user device determined in step 721, the data representative of the three-dimensional position of the asset stored in step 707, and the information to be displayed in the augmented reality application with the asset that was associated in step 709. Step 723 may include determining an angle for a camera of the mobile device based on a measurement by an accelerometer and/or a gyroscope. For example, measured data from accelerometer 624 and/or gyroscope 626 may be used to determine the angle of camera 616 of mobile device 600 relative to the ground for defining a field of view of the camera 616. Step 723 also may include determining an area on the display screen of the mobile device to render the information to be displayed in the augmented reality application with the asset based upon the determined angle of the mobile device. For example, graphical user interface 1011 may be displayed above image element 1021 showing asset A 1001 on the display of mobile device 905. Because asset A 1001 is rendered in image 907 at the lower part of the display screen based upon the angle the mobile device 905 is positioned, graphical user interface 1011 is positioned above it to see the measured element, e.g., pressure reading, for the asset. If the mobile device 905 where angled further towards the ground, the image element

1021 would move closer to the top of the display of the mobile device 905 and the graphical user interface 1011 may be positioned below image element 1021 in order to fit on the display while still showing the image element 1021.

Moving to step 725, a determination may be made as to whether the user device application for rendering an augmented view has been deactivated. For example, a user may turn off the mobile device using the application and thus shutting down use of the application or a user may close the application on the mobile device itself. If the application has been deactivated in step 725, the process may end. Else, the process may return to step 719.

Figure 8:
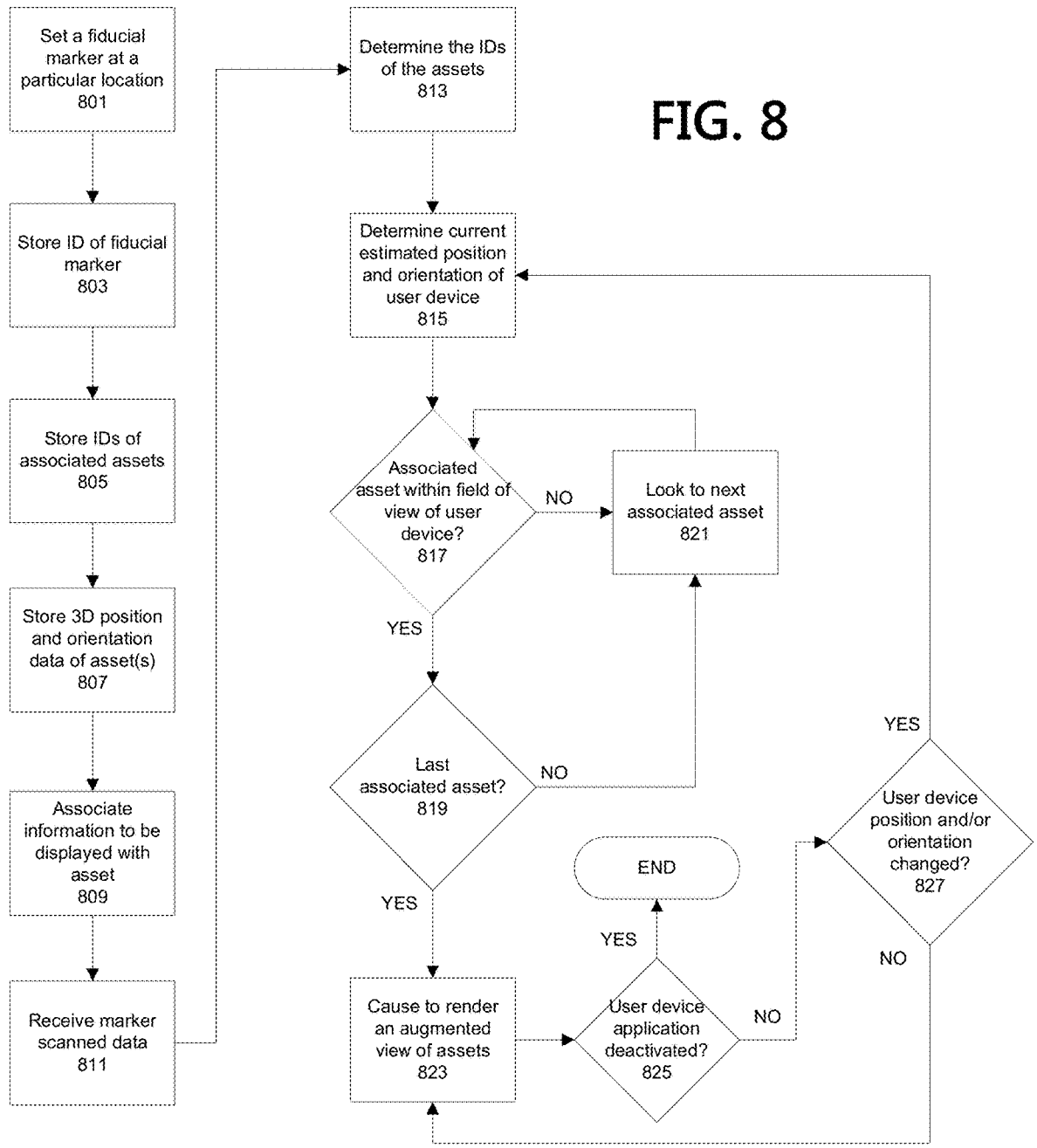
FIG. 8 depicts another illustrative flow diagram of one or more steps that one or more devices may perform in controlling one or more aspects of a plant operation in accordance with one or more example embodiments.

FIG. 8 depicts another illustrative flow diagram of one or more steps that one or more devices may perform in controlling one or more aspects of a plant operation in accordance with one or more example embodiments. In step 801, a fiducial marker may be set at a predetermined location within a petrochemical refinery or plant. Such a fiducial marker may be fiducial marker 507 shown in FIG. 5. Proceeding to step 803, identification data of the fiducial marker may be stored. The identification data of the fiducial marker may be stored in an index in a database, such the index stored in database 505 of FIG. 5. In step 805, identification data of a plurality of assets associated with the fiducial marker is stored. In step 807, for each of the plurality of assets, data representative of a three-dimensional position and orientation of the asset may be stored. This identification data and data representative of the three-dimensional position and orientation of the asset may be stored in an index in a database, such the index stored in database 505 of FIG. 5.

Moving to step 809, for each of the plurality of assets noted in step 807, information that is to be displayed in an augmented reality application with the asset is associated in a database. The database may be the database 505 of FIG. 5. The information that is to be displayed in the augmented reality application with the asset may be the identification of the asset as well as a measurable element, e.g., pressure reading, of the asset in addition to a graphical user interface. Proceeding to step 811, data representative of a user device scanning the fiducial marker may be received. The data may include the identification of the fiducial marker. Step 811 may be performed by a mobile device having a camera to capture an image of the fiducial marker, such as mobile device 905 capturing an image of fiducial marker 901.

In step 813, the identifications of the plurality of assets associated with the fiducial marker may be determined. One manner for this determination is by using the data stored in an index in a database, such as the data stored in step 805 for an index in database 505. Moving to step 815, a current estimated three-dimensional position and a current estimated orientation of the user device may be determined. On manner for such a determination may be by using a dead-reckoning technique based upon the stored position and the orientation data of the assets associated with the user device from step 807.

In step 817, a determination may be made as to whether an asset of the plurality of assets associated with the fiducial marker is within a field of view of the mobile device. The field of view of the mobile device may be a field of view of a camera of the mobile device, such as camera 616 of mobile device 600. Such a determination may be made based upon the data representative of the user device scanning the fiducial marker in step 811 and the current estimated position and orientation of the mobile device in step 815. Whether an asset is within the field of view follows from the geometry of the 3D rendering environment. A 3D rendering environment such as Microsoft DirectX or the Unity Game Engine includes an object known as the viewing frustum, which is the volume of space visible to the "camera" viewing the 3D scene. Any object in this space is visible. This technique applies directly to augmented reality applications as well. If the asset is determined to be in the field of view of the mobile device, the process may proceed to step 819. Else, the process may proceed to step 821.

In step 819, a determination may be made as to whether the last of the assets associated with the fiducial marker from step 805 has been determined to be within the field of view of the mobile device. If the last asset is determined in step 819, the process may move to step 823. If not, the process may move to step 821. In step 821, the process may look to the next asset associated with the fiducial marker from step 805 and then return to step 817 for determining whether that associated asset is within the field of view of the mobile device.

In step 823, an augmented view of one or more of the associated assets within the field of view of the camera of the mobile device may be rendered on a display of the mobile device. For example, rendered image 907 in FIG. 10 on mobile device 905 is one such example. Reference element 1011 is a graphical user interface rendered on the display. The augmented view may be rendered based upon the determined current estimated three-dimensional position and current estimated orientation of the user device from step 815, the data representative of the three-dimensional position and orientation of the asset from step 807, the assets determined to be within the field of view of the user device from step 817-821, and the information to be displayed in the augmented reality application with the asset(s) from step 809. The augmented view of assets may take into account the position of one asset to be rendered relative to the position of another asset to be rendered. For example, one asset of those in the field of view of a mobile device may be determined to be closer to the mobile device than another asset. FIG. 10 illustrates an example where asset A 1001 is closer than each of assets B 1003, C 1005, and N 1007. In such an example, rendered data associated with the assets A 1001, B 1003, C 1005, and N 1007 may be different as well as the amount of rendered data shown. For example, data identifying an asset may be shown in a graphical user interface for each of the assets within a rendered image, such as each of reference elements 1011, 1013, 1015, and 1017. Reference elements 1011, 1013, 1015, and 1017 show an identification of the respective assets A 1001, B 1003, C 1005, and N 1007. But a measured element is only shown for asset A 1001 and B 1003. Although measured elements for each of the assets may be displayed, to avoid overcrowding the displayed data in the augmented reality use, the display of the mobile device 905 only shows additional data, the measured data, for closer assets.

Moving to step 825, a determination may be made as to whether the user device application for rendering an augmented view has been deactivated. If the application has not been deactivated, the process may proceed to step 827. In step 827, a determination may be made as to whether the user device that scanned the fiducial marker in step 811 has changed its three-dimensional position and/or orientation. If the user device has changed position and/or orientation, the process returns to step 815, else, the process returns to step 823. Returning to step 825, if the application has been deactivated, the process may end.

FIG. 9 depicts an illustrative user interface for viewing information and/or scanning fiducial markers related to one or more aspects of a plant operation in accordance with one or more example embodiments. Mobile device 905 shows a rendered image 907 for what a camera associated with the mobile device may capture. Mobile device 905 may be mobile device 600 that include camera 616. In this example, mobile device 905 is capturing an image of a fiducial marker 901 that is positioned on a wall 903. FIG. 10 depicts an illustrative augmented reality view user interface in an industrial plant environment in accordance with one or more example embodiments. Mobile device 905 shows a rendered image 907 for what a camera associated with the mobile device may capture. In this example, mobile device 905 is capturing an image of a plurality of assets A 1001, B 1003, C 1005, and N 1007 in a petrochemical refinery or plant. Graphical user interfaces 1011, 1013, 1015, and 1017 for each of the respective assets A 1001, B 1003, C 1005, and N 1007 is shown rendered on a display along with the assets captured by the camera of the mobile device 905. Reference element 1011 shows an identification of the asset A 1001 as well as a measured element, in this example pressure, of the asset A 1001. The graphical user interface may include one or more indicators for measured elements that need the attention of a user. For example, graphical user interface 1011 shows a check mark beside the identification of the asset A 1001 that may indicate that the measured element is within an allowable level of operation, is above an allowable threshold for operation, or is below an allowable threshold for operation. Alternatively, graphical user interface 1013 shows an "X" mark beside the identification of the asset B 1003 that may indicate that the measured element is not within an allowable level of operation, is above an allowable threshold for operation, or is below an allowable threshold for operation. Such an indication may be an example where a user of the mobile device 905 may need to take corrective action, e.g., may need to lower the pressure by turning a valve or may need to increase the pressure by operating a switch.

One or more features described herein may be embodied in a computer-usable data and/or computer-executable instructions, such as in one or more program modules, executed by one or more computers or other devices. Program modules may include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. In addition, the functionality may be embodied in whole or in part in firmware or hardware equivalents such as integrated circuits and/or field programmable gate arrays ("FPGA"). Particular data structures may be used to more effectively implement one or more features of the disclosure, and such data structures are contemplated within the scope of computer executable instructions and computer-usable data described herein.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps illustrated in the illustrative figures may be performed in other than the recited order, and one or more depicted steps may be optional in accordance with aspects of the disclosure. Accordingly, the foregoing description is by way of example only, and is not limiting.

What is claimed is:

1. A method comprising:
   storing, in a database, an index, the index comprising:
   identification of a fiducial marker at a location within a petrochemical plant or refinery,
   data representative of a three-dimensional position and an orientation of the fiducial marker,
   identifications of a plurality of assets within a predetermined vicinity of the fiducial marker, wherein the plurality of assets are physically separated from the fiducial marker, and, for each of the plurality of assets, data representative of a three-dimensional position of the asset,
   for each of the plurality of assets, associating, in the database, information to be displayed in an augmented reality application with the asset;
   receiving data representative of a user mobile computing device scanning the fiducial marker, the data including the identification of the fiducial marker;
   determining a three-dimensional position and an orientation of the user mobile computing device relative to the fiducial marker;
   determining an absolute position and an absolute orientation of the user mobile computing device based upon the determined three-dimensional position and the determined orientation of the user mobile computing device relative to the fiducial marker and the data representative of the three-dimensional position and the orientation of the fiducial marker;
   determining, from the index, the identifications of the plurality of assets within the predetermined vicinity of the fiducial marker;
   determining a current estimated three-dimensional position and a current estimated orientation of the user device using a dead-reckoning technique based upon the determined absolute position and the determined absolute orientation of the user mobile computing device;
   causing to render, on the user mobile computing device, an augmented view of at least one asset of the plurality of assets based upon the determined current estimated three-dimensional position and current estimated orientation of the user mobile computing device, the data representative of the three-dimensional position of the asset, and the information to be displayed in the augmented reality application with the asset, including determining an area on a display screen of the user mobile computing device to render the information to be displayed in the augmented reality application with the asset based upon a determined angle of the user mobile computing device wherein the augmented view of at least one asset of the plurality of assets moves to the top of the display when the user mobile computing device is angled to the ground, and
   determining which assets, of the plurality of assets, within the predetermined vicinity of the fiducial marker are within a field of view of the user mobile computing device based upon the current estimated orientation of the user mobile computing device, wherein the causing to render the augmented view of the at least one asset of the plurality of assets is based on the determined assets within the field of view of the user mobile computing device.

2. The method of claim 1, wherein the augmented view comprises data representing one or more operating values for a measurable element of the asset.

3. The method of claim 2, wherein the measurable element is a pressure value of the asset of the petrochemical plant or refinery.

4. The method of claim 1, wherein the causing to render the augmented view of the at least one asset of the plurality of assets comprises:
determining an angle of the user mobile computing device based on a measurement from at least one of an accelerometer or a gyroscope.

5. The method of claim 1, further comprising providing the fiducial marker at the location within the petrochemical plant or refinery.

6. The method of claim 1, wherein the information to be displayed in the augmented reality application with the asset comprises data representing one or more operating values for a measurable element of the asset.

7. A method comprising:
storing, in a database, an index, the index comprising data representative of an identification of a fiducial marker located within a petrochemical plant or refinery;
storing, in the index, identifications of a plurality of assets associated with the fiducial marker, wherein the plurality of assets are physically separated from the fiducial marker;
for each of the plurality of assets, storing data representative of a three-dimensional position and orientation of the asset relative to the associated fiducial marker;
for each of the plurality of assets, associating, in the database, information to be displayed in an augmented reality application with the asset;
receiving data representative of a user mobile computing device scanning the fiducial marker, the data including the identification of the fiducial marker;
determining, from the index, the identifications of the plurality of assets associated with the fiducial marker;
determining a current estimated three-dimensional position and a current estimated orientation of the user mobile computing device using a dead-reckoning technique;
determining which assets, of the plurality of assets, associated with the fiducial marker are within a field of view of the user mobile computing device based upon the data representative of the user device scanning the fiducial marker; and
causing to render, on the user mobile computing device, an augmented view of at least one asset of the plurality of assets based upon the determined current estimated three-dimensional position and current estimated orientation of the user device, the data representative of the three-dimensional position and orientation of the asset, the assets determined to be within the field of view of the user mobile computing device, and the information to be displayed in the augmented reality application with the at least one asset including determining an area on a display screen of the user mobile computing device to render the information to be displayed in the augmented reality application with the asset based upon a determined angle of the user mobile computing device wherein the augmented view of at least one asset of the plurality of assets moves to the top of the display when the user mobile computing device is angled to the ground, and wherein the causing to render the augmented view of the at least one asset of the plurality of assets is based on the determined assets within the field of view of the user mobile computing device.

8. The method of claim 7, wherein the augmented view comprises data representing one or more operating values for a measurable element of the asset.

9. The method of claim 8, wherein the measurable element is a pressure value of the asset of the petrochemical plant or refinery.

10. The method of claim 7, wherein the causing to render the augmented view of the at least one asset of the plurality of assets comprises:
determining an angle of the user mobile computing device based on a measurement from at least one of an accelerometer or a gyroscope.

11. The method of claim 7, further comprising providing the fiducial marker at a location within the petrochemical plant or refinery.

12. The method of claim 7, wherein the information to be displayed in the augmented reality application with the asset comprises data representing one or more operating values for a measurable element of the asset.

13. The method of claim 7, wherein the assets determined to be within the field of view of the user mobile computing device comprises two assets, and wherein the causing to render the augmented view comprises:
determining a first asset of the two assets is closer to the user mobile computing device than a second asset of the two assets,
causing to render a first information to be displayed in the augmented reality application with the second asset, and
causing to render a first information and a second information to be displayed in the augmented reality application with the first asset.

14. A system comprising:
a database configured to store an index, the index comprising:
identification of a fiducial marker at a location within a petrochemical plant or refinery, the fiducial marker establishing a three-dimensional position and an orientation of the fiducial marker,
data representative of the three-dimensional position and the orientation of the fiducial marker,
identifications of a plurality of assets within a predetermined vicinity of the fiducial marker, wherein the plurality of assets are physically separated from the fiducial marker, and, for each of the plurality of assets, data representative of a three-dimensional position of the asset, and
for each of the plurality of assets, associated information to be displayed in an augmented reality application with the asset;
a mobile computing device comprising:
one or more processors;
a communication interface in communication with the database; and
non-transitory computer-readable memory storing executable instructions that, when executed, cause the mobile computing device to:
receive data representative of a user scanning the fiducial marker, the data including the identification of the fiducial marker,
determine a three-dimensional position and an orientation of the mobile computing device relative to the fiducial marker, determine an absolute position and an absolute orientation of the mobile computing device based upon the determined three-dimensional position and the determined orientation of the mobile computing device relative to the fiducial marker and the data representative of the three-dimensional position and the orientation of the fiducial marker, determine, from the index, the identifications of the plurality of assets within the predetermined vicinity of the fiducial marker, determine a current estimated three-dimensional position and a current estimated orientation of the mobile computing device using a dead-reckoning technique based upon the determined absolute position and the determined absolute orientation of the mobile computing device, cause to render, on the mobile computing device, an augmented view of at least one asset of the plurality of assets based upon the determined current estimated three-dimensional position and current estimated orientation of the mobile computing device, the data representative of the three-dimensional position of the asset, and the information to be displayed in the augmented reality application with the asset, including determining an area on a display screen of the user mobile computing device to render the information to be displayed in the augmented reality application with the asset based upon a determined angle of the user mobile computing device wherein the augmented view of at least one asset of the plurality of assets moves to the top of the display when the user mobile computing device is angled to the ground, and determining which assets, of the plurality of assets, within the predetermined vicinity of the fiducial marker are within a field of view of the user mobile computing device based upon the current estimated orientation of the user mobile computing device, wherein the causing to render the augmented view of the at least one asset of the plurality of assets is based on the determined assets within the field of view of the user mobile computing device.

15. The system of claim 14, wherein the augmented view comprises data representing one or more operating values for a measurable element of the asset.

16. The system of claim 15, wherein the measurable element is a pressure value of the asset of the petrochemical plant or refinery.

17. The system of claim 14, wherein the mobile computing device further comprises a camera, and the instructions further cause the mobile computing device to receive an image of the fiducial marker captured by the camera.

18. The system of claim 14, further comprising the fiducial marker at the location within the petrochemical plant or refinery.

19. The system of claim 14, wherein the information to be displayed in the augmented reality application with the asset comprises data representing one or more operating values for a measurable element of the asset.

* * * * *